US007924243B2

(12) United States Patent
Kanai et al.

(10) Patent No.: US 7,924,243 B2
(45) Date of Patent: Apr. 12, 2011

(54) IMAGE DISPLAY APPARATUS FOR FORMING AN IMAGE WITH A PLURALITY OF LUMINESCENT POINTS

(75) Inventors: Izumi Kanai, Kanagawa (JP); Yukio Hiraki, Kanagawa (JP); Makiko Mori, Kanagawa (JP); Kohei Inamura, Kanagawa (JP); Masaru Tada, Kanagawa (JP); Toshiyuki Kanda, Kanagawa (JP); Tatsuro Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 11/407,979

(22) Filed: Apr. 21, 2006

(65) Prior Publication Data

US 2006/0187152 A1 Aug. 24, 2006

Related U.S. Application Data

(62) Division of application No. 10/136,393, filed on May 2, 2002, now Pat. No. 7,142,177.

(30) Foreign Application Priority Data

May 7, 2001 (JP) ................................ 2001-136614
Apr. 30, 2002 (JP) ................................ 2002-127913

(51) Int. Cl.
*G09G 3/20* (2006.01)
*H01J 1/62* (2006.01)
*H04N 3/12* (2006.01)

(52) U.S. Cl. ....... 345/75.2; 345/74.1; 348/796; 313/495

(58) Field of Classification Search ........ 345/74.1–75.2; 313/495–497; 348/796
See application file for complete search history.

(56) References Cited

U.S. PATENT DOCUMENTS

| | | | | |
|---|---|---|---|---|
| 5,748,328 | A | 5/1998 | Usami et al. | 358/1.9 |
| 6,307,327 | B1 | 10/2001 | Xie et al. | 315/169.4 |
| 6,419,366 | B1 | 7/2002 | Namioka | 359/601 |
| 6,842,160 | B2 | 1/2005 | Yamazaki et al. | 345/76 |
| 6,873,338 | B2 | 3/2005 | Berstis | 345/596 |
| 2002/0171608 | A1 | 11/2002 | Kanai et al. | 345/55 |

FOREIGN PATENT DOCUMENTS

| | | | |
|---|---|---|---|
| EP | 0 660 367 | A | 6/1995 |
| EP | 0 747 925 | A | 12/1996 |
| EP | 0 869 528 | A2 | 10/1998 |
| EP | 0 869 530 | A2 | 10/1998 |
| EP | 0 875 917 | A1 | 11/1998 |
| JP | 7-336700 | | 12/1995 |
| JP | 9-190783 | | 7/1997 |
| JP | 10-301527 | | 11/1998 |
| JP | 11-194739 | | 7/1999 |
| JP | 2003-536091 | | 12/2003 |
| JP | 3937906 | | 4/2007 |
| WO | WO 00/02081 | | 1/2000 |

OTHER PUBLICATIONS

Japanese Official Communication dated Jun. 3, 2008, regarding Application No. 2006-270783.

*Primary Examiner* — Kevin M Nguyen
*Assistant Examiner* — Cory A Almeida
(74) *Attorney, Agent, or Firm* — Fitzpatrick, Cella, Harper & Scinto

(57) ABSTRACT

The present invention relates to an image display apparatus for forming an image with a plurality of luminescent spots to be precisely aligned in a matrix. For example, a spacer disposed between an electron source and a face plate causes luminescent spots on the face plate spaced unevenly. The luminescent spots spaced unevenly will produce a visual unevenness in luminance which deteriorates the quality of produced image. By modifying the quantity of light of luminescent spots spaced unevenly, the visual unevenness in luminance is compensated.

6 Claims, 16 Drawing Sheets

FIG. 13

| INPUT | OUTPUT |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 1 |
| 11 | 2 |
| 12 | 2 |
| 13 | 1 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 0 |

IMAGE DISPLAY APPARATUS FOR FORMING AN IMAGE WITH A PLURALITY OF LUMINESCENT POINTS

This application is a division of U.S. application Ser. No. 10/136,393, filed May 2, 2002.

BACKGROUND OF THE INVENTION

1. Field of the Invention

The present invention relates to an image display apparatus for forming an image with a plurality of luminescent spots.

2. Related Background Art

Image display apparatus have been known which form an image using an electron source.

In a configuration in which a member is irradiated through exposure to electrons outputted from an electron source, preferably the electron path between the electron-emitting region and irradiated part is under a vacuum atmosphere.

However, if the pressure inside is reduced, the pressure difference from atmospheric pressure outside Will act to deform the depressurized space. Under such circumstances, preferably a configuration with spacers installed inside is adopted.

An example of an image display apparatus in which spacers are installed inside has been disclosed in Japanese Patent Application Laid-Open No. 10-301527.

Technology disclosed in this patent application offers a configuration in which spacers are installed between an electron source and face plate. Also, the patent application discloses that the spacers, when charged, will bend trajectories of electrons emitted from cold cathode devices in the direction closing to the spacer, that electrons which bombard positions different from proper positions on phosphors may cause image distortion, and that the electrons emitted from the devices and bombarding the spacers may reduce luminance near the spacers.

The patent application described above also discloses that the arrival position, on the face plate, of the electrons emitted from the devices can be adjusted as required by changing the voltage applied to the devices. Also, the patent application discloses a configuration in which the distance between the electron-emitting region and landing position of electrons is made approximately equal for all the devices by applying different voltages to the devices near the spacers and the other devices. Also, the patent application discloses a configuration in which the amounts of electrons emitted from all the devices are made approximately equal by varying the electron emission characteristics of the devices even when the distance between the electron-emitting region and landing position of electrons is made approximately equal for all the devices by applying different voltages to the devices near the spacers and the other devices.

Besides, U.S. Pat. No. 6,121,942 and U.S. Pat. No. 6,140,985 disclose a configuration for adjusting electron irradiation position while Japanese Patent Application Laid-Open No. 11-194739 discloses a configuration for adjusting a luminescent area depending on resolution. Other patent applications which relate to technologies employing spacers and electron-emitting devices include Japanese Patent Application Laid Open. No. 9-190783 and European Patent Publication Nos. EP 0 869 530 A2, EP 0 869 528 A2, and EP 0 875 917 A1.

SUMMARY OF THE INVENTION

Configurations for forming an image with a plurality of luminescent spots may cause visual unevenness in luminance.

One of more concrete problems which can be corrected by an embodiment of the present invention is as follows. As described above, spacers may deflect electron trajectories. Not only spacers, but also any member installed in the area where electron-emitting devices are arranged may deflect electron trajectories.

In addition to the electron-emitting devices described above, electro-luminescent devices, when used as display elements, may cause luminescent spots which form an image to shift from desired position.

The object of the present invention is to provide an image display apparatus which can form images of improved quality using a simple configuration.

An image display apparatus according to the present invention comprises:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein intervals between adjacent luminescent spots in a given direction are nonuniform, the quantity of light of at least one luminescent spot is corrected, and the light quantity correction of the luminescent spot reduces visual unevenness in luminance.

The visual unevenness in luminance here means the unevenness in luminance perceived by an observer with normal eyesight when he/she observes the irradiated member on which a plurality of luminescent spots are formed. Specifically, unevenness in luminance is observed by an observer with normal eyesight (1.0) at a distance of L from the irradiated member when L is given by the following equation where K is the average value of the above described intervals between adjacent luminescent spots in the given direction.

$$L=K/(2\tan(1/120)^{\circ})$$

For example, if K is 0.5 mm, L is 1.72 m.

The description that light quantity correction reduces visual unevenness in luminance means that the unevenness in luminance observed under the above observation conditions without correction is reduced (or eliminated) when observed after correction according to the present invention.

Thus, technical significance of the present invention lies in the fact that even if intervals between luminescent spots are nonuniform, the present invention reduces visual unevenness in luminance (visual unevenness in brightness) without making the intervals between luminescent spots completely uniform. In other words, when intervals between luminescent spots are nonuniform, although the present invention does not rule out a configuration in which intervals between luminescent spots become more uniform as a result of the light quantity correction according to the present invention or a configuration in which separate control is performed so as to make intervals between luminescent spots more uniform along with the light quantity correction according to the present invention, the scope of the present invention does not cover a configuration in which corrections are made in such a way as to make otherwise nonuniform intervals between luminescent spots completely uniform.

The present invention includes the following image display apparatus.

An image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the amounts and/or directions of displacement of luminescent spots from respective reference positions defined at regular intervals in a given direction are nonuniform and the quantity of light of some luminescent spots which form an image are corrected according to the amounts and/or directions of the displacement, and an image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the amounts and/or directions of displacement of luminescent spots from respective reference positions defined at regular intervals in a given direction are nonuniform, the quantity of light of at least one luminescent spot is corrected, and the light quantity correction of the luminescent spot reduces visual unevenness in luminance.

The reference positions here are defined virtually, at regular intervals in a given direction. The interval between adjacent luminescent spots in an area where a plurality of luminescent spots are arranged at approximately equal interval is taken for the regular interval (reference interval). Visual distribution of brightness is uniform within an area where a group of luminescent spots are arranged at regular intervals and displaced in an equal amount and in the same direction from the respective reference positions. If the electron-emitting devices are arranged uniformly in a given direction and they have the same device configuration, the intervals between the electron-emitting regions of the electron-emitting devices adjacent to each other in the given direction described above are taken for the regular intervals.

Also, the present invention includes the following image display apparatus.

An image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the above described electron source at least includes six electron-emitting devices which are arranged in a given direction and which form six respective luminescent spots, and among the six luminescent spots, the interval between the two luminescent spots at the center is the smallest of the intervals between adjacent luminescent spots, and a correction has been made to make the quantity of light of at least one of the two luminescent spots relatively smaller than the quantity of light of the other luminescent spots, and an image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the above described electron source at least includes six electron-emitting devices which are arranged in a given direction and which form six respective luminescent spots, and among the six luminescent spots, the interval between the two luminescent spots at the center is the largest of the intervals between adjacent luminescent spots, and a correction has been made to make the quantity of light of at least one of the two luminescent spots relatively larger than the quantity of light of the other luminescent spots.

In each of the image display apparatus described above, the present invention may include a configuration which comprises deflectors for deflecting the trajectories of the electrons emitted from the above described electron-emitting devices. Any such deflector, if installed, tends to produce nonuniformity in the intervals between luminescent spots or in the displacement of luminescent spots from the reference positions, but the present invention can solve visual problems without eliminating the nonuniformity completely.

The "deflector" here is not limited to the one intended to cause deflection intentionally. It refers to a member which deflects electron trajectories, whether intentionally or not.

Also, the present invention includes the following image display apparatus.

An image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the above described image display apparatus further comprises a deflector for deflecting the trajectories of the electrons emitted from the above described electron-emitting devices, and a plurality of luminescent spots that form an image include two adjacent luminescent spots which are placed on opposite sides of the above described deflector at an interval smaller than the interval between any other two adjacent luminescent spots between which the deflector is not placed and at least one of whose quantity of light is corrected such that it will be relatively smaller than the quantity of light of the other luminescent spots, and an image display apparatus comprising:

an electron source having electron-emitting devices; and an irradiated member which is disposed in opposing relation to the electron source and forms a luminescent spot at a different location on itself corresponding to different electron-emitting device by irradiation with electrons emitted from each of the above described electron-emitting devices, wherein the above described image display apparatus further comprises a deflector for deflecting the trajectories of the electrons emitted from the above described electron-emitting devices, and a plurality of luminescent spots that form an image include two adjacent luminescent spots which are placed on opposite sides of the above described deflector at an interval larger than the interval between any other two adjacent luminescent spots between which the deflector is not placed and at least one of whose quantity of light is corrected such that it will be relatively larger than the quantity of light of the other luminescent spots.

Incidentally, the above described deflector in the image display apparatus described-above may be a spacer which maintains the interval between the above described electron source and irradiated member.

Preferably, the above described plurality of electron-emitting devices are arrayed in a matrix and disposed at approximately equal intervals in the column direction.

Preferably, the above described plurality of electron-emitting devices are arrayed in a matrix and disposed at approximately equal intervals in the row direction.

Also, a drive circuit is provided to drive the above described electron source. Preferably, it controls arrival conditions of the electrons emitted from the above described plurality of electron-emitting devices arrayed in a matrix to the above described irradiated member.

Preferably, means for adjusting the amount of the above described light quantity correction is provided.

In a configuration in which the above described plurality of electron-emitting devices are wired in a matrix from a plurality of scan lines and a plurality of modulation lines, the above described correction can be made by controlling the amplitude (electric potential or current value) of a modulating signal applied to the modulation lines. To control the electric potential of the modulating signal applied to the modulation lines, a configuration is preferably selected in which the control is performed by selecting an electric potential from a plurality of predetermined electric potentials. In so doing, the electric potential of the selection signal applied to the above described scan lines is preferably controlled by selecting an electric potential from a plurality of predetermined electric potentials. Besides, the electric potential of the modulating signal applied to the modulation lines is preferably determined based on positional information of the electron-emitting devices to which the modulating signal is applied. Also, the electric potential of the modulating signal applied to the modulation lines may be controlled by selecting a reference potential for use in generating the electric potential of the modulating signal.

Also, in a configuration in which the above described plurality of electron-emitting devices are wired in a matrix from a plurality of scan lines and a plurality of modulation lines, the above described correction can be made by controlling the electric potential of a selection signal applied to the scan lines. Besides, the electric potential of the selection signal applied to the scan lines is preferably determined by selecting a plurality of predetermined electric potential. Also, the electric potential of the selection signal applied to the scan lines is preferably determined based on positional information of the scan lines to which the selection signal is applied.

Also, as means for the above described light quantity correction, various configurations are available. One of them involves correcting inputted image signals, generating drive pulses based on the corrected image signals, and driving the above described electron-emitting devices by the drive pulses. If the drive pulses are regarded to be the modulating signal for matrix driving, this means that the electron-emitting devices are driven by the potential difference between the electric potential of the selection signal and electric potential of the drive pulses.

Also, a configuration is preferably adopted in which a memory is provided to store a plurality of transfer characteristics and in which the above described correction is made through selection of a transfer characteristic for converting the above described inputted image signals. For example, a transfer characteristic designed to convert gamma characteristics of input signals may be used.

Incidentally, the above described positional information can be obtained by counting a count signal. If a deflector is provided and the interval between adjacent luminescent spots is correlated with their distance from the deflector, the necessity or amount of correction can be determined based on information about relative position to the deflector.

In the present invention, for luminescent spots formed in the vicinity of the spacer and other luminescent spots formed far from the spacer according to data signals which require the same quantity of light, the quantity of light for at least one of the luminescent spots is adjusted so that the luminescent spots in the vicinity of the spacer become different in quantity of light from said other luminescent spots. The present invention provides image display apparatus for displaying an image in which the visual unevenness in luminance is reduced by the above adjustment.

Also, the present invention includes the following image display apparatus.

An image display apparatus for forming an image with a plurality of luminescent spots, wherein:

intervals between adjacent luminescent spots in a given direction are nonuniform, the quantity of light of at least one luminescent spot is corrected, and the light quantity correction of the luminescent spot reduces unevenness in luminance, and an image display apparatus for forming an image with a plurality of luminescent spots, wherein:

the amounts and/or directions of displacement of luminescent spots from respective reference positions defined at regular intervals in a given direction are nonuniform and the quantity of light of some luminescent spots which form an image are corrected according to the amounts and/or directions of the displacement, and an image display apparatus for forming an image with a plurality of luminescent spots, wherein:

the amounts and/or directions of displacement of luminescent spots from respective reference positions defined at regular intervals in a given direction are nonuniform, the quantity of light of at least one luminescent spot is corrected, and the light quantity correction of the luminescent spot reduces unevenness in luminance.

Incidentally, features of the different image display apparatus described above may be used in combination.

BRIEF DESCRIPTION OF THE DRAWINGS

FIG. 13 is a diagram showing a configuration example of a lookup table used by the fourth example of the present invention;

DETAILED DESCRIPTION OF THE PREFERRED EMBODIMENTS

A preferred embodiment of the present invention will be illustrated in detail below with reference to the drawings. However, the dimensions, materials, shapes, relative arrangements of the components cited in relation to the embodiment are not intended to limit the scope of the present invention unless otherwise stated.

Figure 1:
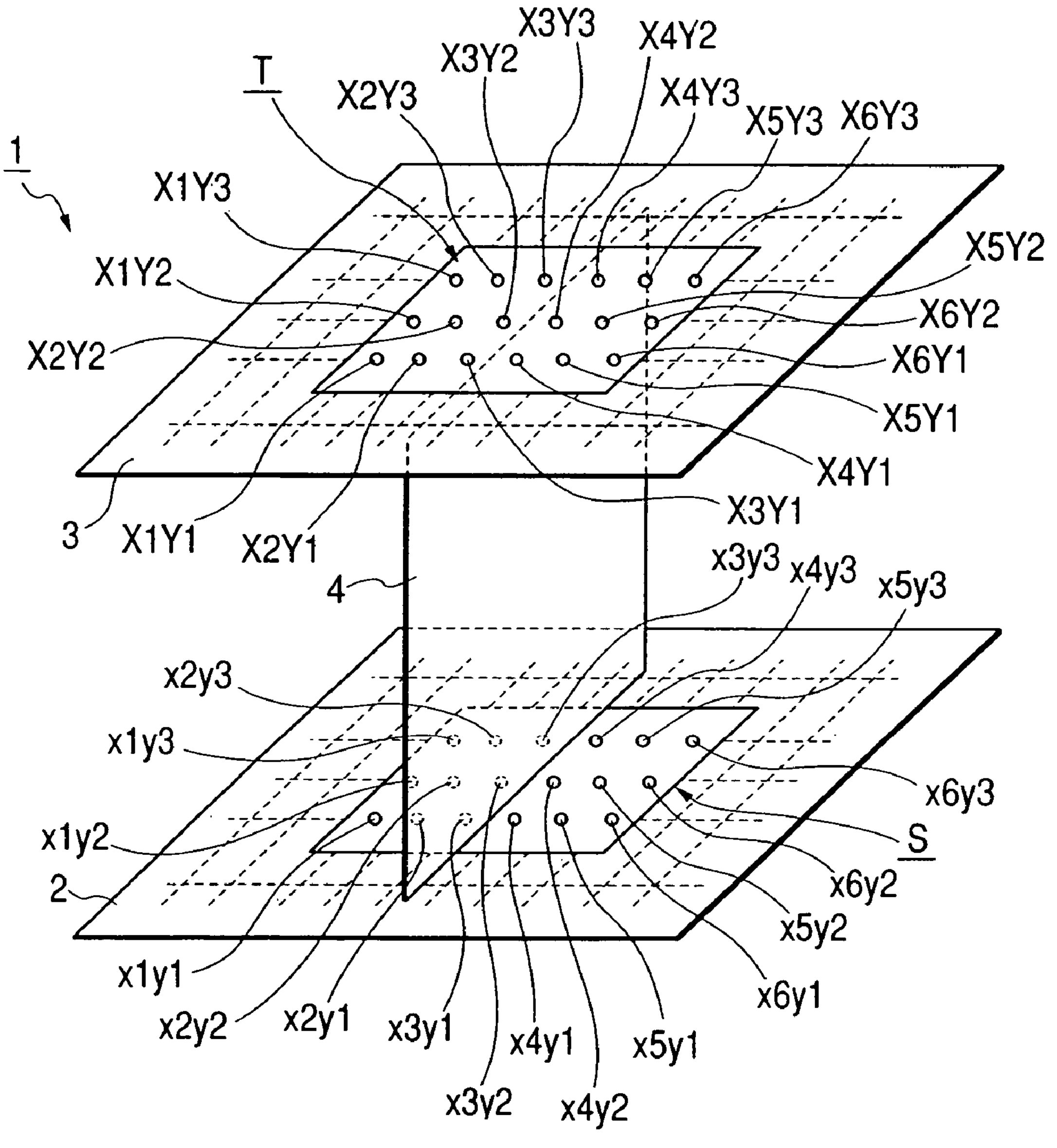
FIG. 1 is a schematic perspective view of an image display apparatus according to an embodiment of the present invention.
Figure 2:
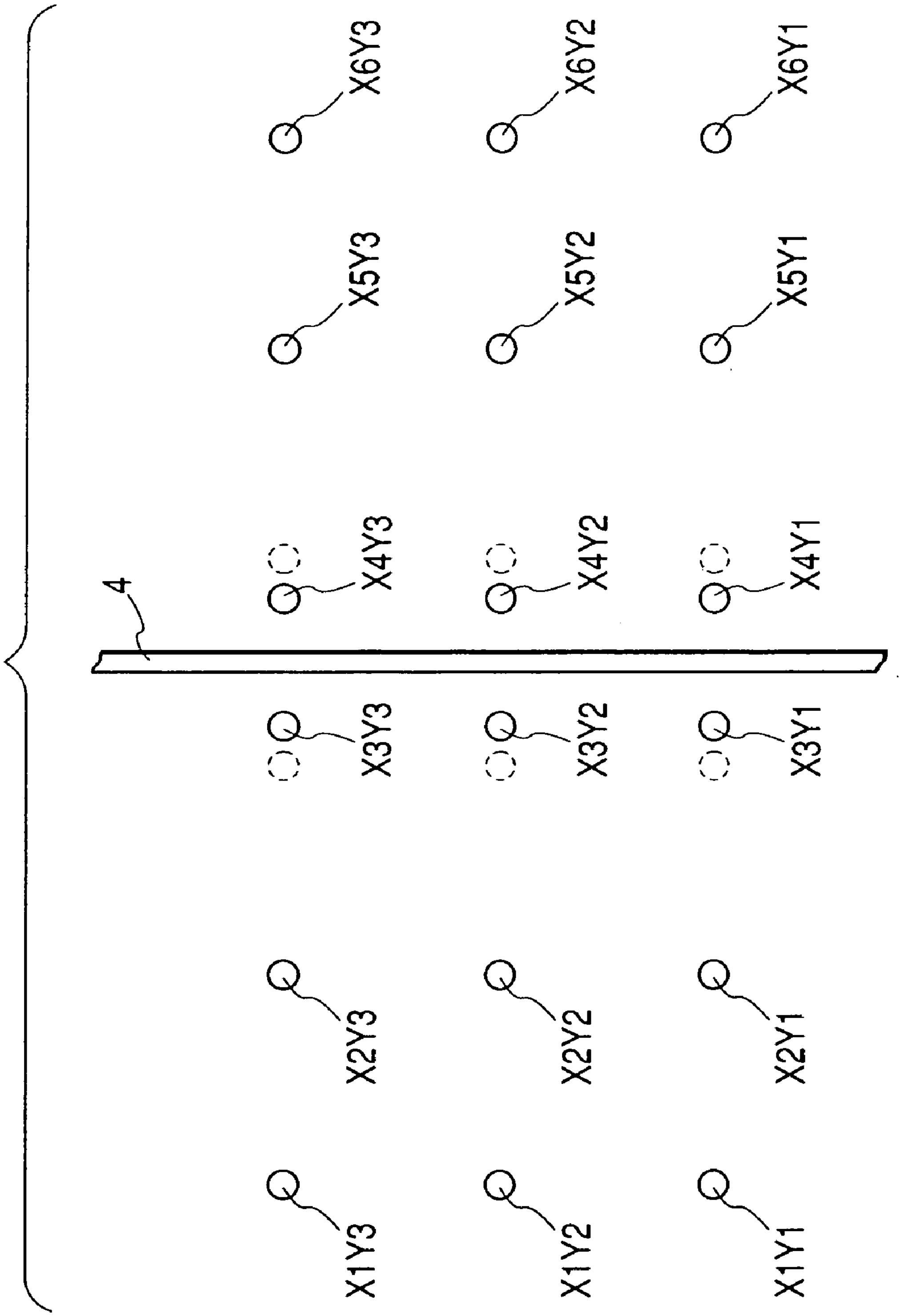
FIG. 2 is a plan view showing part of the luminescent spot array shown in FIG. 1.

An image display apparatus and its drive method according to the embodiment of the present invention will be described with reference to FIGS. 1 and 2. FIG. 1 is a schematic perspective view of the image display apparatus according to the embodiment of the present invention and FIG. 2 is a plan view showing part of the luminescent spot array shown in FIG. 1.

As shown in FIG. 1, the image display apparatus 1 according to the embodiment of the present invention comprises an electron source 2 consisting of an array of electron-emitting devices, and an irradiated member 3 disposed in opposing relation to the electron source 2.

The irradiated member 3 forms luminescent spots through bombardment of electrons emitted from the electron source 2. The luminescent spots are formed at different locations corresponding to different electron-emitting devices. Therefore, by controlling the electron-emitting devices with a drive circuit (not shown) according to desired image information, it is possible to form luminescent spots at locations corresponding to the image information, and thus form an image.

The electrons emitted from the electron-emitting devices form trajectories according to an electric field formed in the apparatus. Here, the electric field is formed in the apparatus uniformly, and thus the array of luminescent spots formed on the irradiated member 3 matches the array of the electron-emitting devices when electrons are emitted from all the electron-emitting devices.

Suppose, for example, the electron-emitting devices (their electron-emitting regions) are arranged in a matrix in region S of the electron source 2 as shown in FIG. 1, then the resulting luminescent spots will form a similar matrix in corresponding region T of the irradiated member 3.

In other words, if region S contains a 3-row by 6-column matrix evenly space in both row and column directions as shown in FIG. 1, ideally the luminescent spots in region T of the irradiated member 3 are also arranged in an evenly spaced 3-row by 6-column matrix. Incidentally, although the 3 by 6 luminescent spots are shown here in a single drawing, they need not illuminate simultaneously. They may illuminate in sequence.

In the example of FIG. 1, the electrons emitted from electron-emitting region xnym forms luminescent spot XnYm (n=1 to 6; m=1 to 3).

However, if there is a deflector 4 which deflects electron trajectories, the arrangement of luminescent spots will be disturbed. In short, there will be errors in the positions of the luminescent spots.

Specifically, as shown in FIGS. 1 and 2, in the presence of the deflector 4, emitted electrons are deflected under its influence. Although it is considered that actually the electrons emitted from all the electron-emitting devices are affected, the influence can be ignored at certain distances. In the example shown in the figures, it is assumed that only luminescent spots X3Y1, X3Y2, X3Y3, X4Y1, X4Y2, and X4Y3 close to the deflector 4 are affected: the luminescent spots will be formed at the locations indicated by solid lines as a result of deflection whereas they would be formed at the locations (reference positions) indicated by dotted lines (FIG. 2) in the absence of the deflector 4. Thus, the distance between the dotted line and solid lines represents interval error. In this example, the amounts of displacement of the luminescent spots other than X3Y1, X3Y2, X3Y3, X4Y1, X4Y2, and X4Y3 from their respective reference positions are zero while the amounts of displacement of luminescent spots X3Y1, X3Y2, X3Y3, X4Y1, X4Y2, and X4Y3 from their respective reference positions (the location indicated by dotted lines) are not zero. Since any two adjacent luminescent spots that are placed on opposite sides of the deflector are both displaced towards the deflector away from their respective reference positions, i.e., they are displaced towards each other, the interval between them is particularly small compared to the interval between any other two adjacent luminescent spots oriented approximately in the same direction as the former two luminescent spots, but placed on one side of the deflector.

The reference positions here can be defined as the positions occupied periodically by spots at a reference interval, which in turn can be defined as the interval between luminescent spots which are arranged at approximately equal intervals. Incidentally, a reference interval can be defined in each of given directions. Thus, reference intervals in the row and column directions of the matrix do not need to be the same.

Incidentally, although the luminescent spots are deflected towards the deflector 4 in the example of FIG. 2, deflection may occur in a direction away from the deflector 4.

It has been confirmed that such uneven arrangement of luminescent spots causes unevenness in the resulting image as well.

Thus, the embodiment of the present invention is configured to eliminate unevenness in images by making apparent distribution of brightness (subjective distribution of brightness) uniform through correction of quantity of light while leaving unevenness in the arrangement of luminescent spots (unevenness in the interval between luminescent spots, and/or unevenness in the amount and/or direction of displacement of luminescent spots) as it is.

More specifically, the apparent distribution of brightness is made uniform by correcting the quantity of light according to the intervals between adjacent luminescent spots in groups of luminescent spots.

Regarding light quantity correction, if the interval between a luminescent spot (first luminescent spot) and an adjacent luminescent spot (second luminescent spot) is smaller than the intervals between other luminescent spots, so that the region of smaller intervals visually looks light, the quantity of light of at least one of the two, first and second luminescent spots, is corrected so that it will be relatively smaller than the quantity of light of the other luminescent spots.

If the interval between a luminescent spot (first luminescent spot) and an adjacent luminescent spot (second luminescent spot) is larger than the intervals between other luminescent spots, so that the region of larger intervals visually looks dark, the quantity of light of at least one of the two, first and second luminescent spots, is corrected so that it will be relatively larger than the quantity of light of the other luminescent spots.

Regarding the groups of luminescent spots, a group in which luminescent spots are arranged in the row or column direction can be selected. Then, the intervals between adjacent luminescent spots can be measured.

In the example of FIG. 2, take, for example, a luminescent spot group consisting of six luminescent spots X1Y1, X2Y1, X3Y1, X4Y1, X5Y1, and X6Y1 arranged almost linearly in the row direction.

The interval between luminescent spot X3Y1 and luminescent spot X4Y1 is smaller than the interval between any other two adjacent luminescent spots, as described above. Then, by correcting the quantity of light of at least luminescent spot X3Y1 or luminescent spot X4Y1 so that it will be relatively smaller, it is possible to make the distribution of brightness uniform in appearance.

By correcting the quantity of light of a luminescent spot (corrected luminescent spot) so that it will be relatively smaller or correcting the quantity of light of a luminescent spot so that it will be relatively larger, we mean making corrections so that the quantity of light of the corrected luminescent spot will be smaller or larger than that of uncorrected luminescent spots or luminescent spots corrected to a lesser degree when an external signal is given requesting the same quantity of light to the corrected luminescent spot and the uncorrected luminescent spots or luminescent spots corrected to a lesser degree.

Incidentally, a group of luminescent spots may be selected in any location on the irradiated member but there is no need to correct the quantity of light of luminescent spots if difference in the interval between luminescent spots does not present a particular problem. The correction is not necessarily conducted for all the regions where visual unevenness in luminance due to unevenness for intervals between luminescent spots are recognized. The correction may be conducted only for desired regions. Thus, the embodiment of the present invention applies to at least a group of luminescent spots at one location from among a plurality of luminescent spots.

Also, in the case where the deflector 4 extends in a given direction (direction parallel to the column direction in FIG. 2) and the electron-emitting devices arranged in the given direction are equidistant from the deflector as shown in FIG. 2, it is considered that luminescent spots X3Y1, X3Y2, and X3Y3 will be deflected by the same amount as luminescent spots X4Y1, X4Y2, and X4Y3, and thus the quantity of light can be corrected evenly for all the electron-emitting devices arranged in the given direction.

Thus, in the configuration shown in FIG. 2, by measuring the integrated value or average value of light quantities and dispersion of peak values for each column, a correction can be made to each column using an amount of correction according to the interval error of the given column. Incidentally, although it is assumed in this example that luminescent spots are located on a straight line, there is no need for the luminescent spots to be located exactly on a straight line. Even if they are displaced from a straight line, the present invention can be applied if the intervals between luminescent spots are nonuniform or displacement of luminescent spots form their respective reference positions on a virtual straight line is nonuniform when the luminescent spots are projected on the virtual straight line.

Regarding the electron-emitting device described above, a device which emits electrons when voltage is applied is preferable. The voltage here is given as a potential difference between two different electric potentials. Specifically, the two electric potentials are provided through two wires. It is especially preferable that the two wires be formed on a single substrate, but they may be formed on different substrates.

Also, there are various known electron-emitting devices.

For example, there are surface conduction electron-emitting devices, field emission electron-emitting devices, MIM type electron-emitting devices, etc. Incidentally, the electron-emitting devices here are not limited to those with a single electron-emitting region. For example, it is known that one electron-emitting device has two or more cone-shaped emitter electrodes as in the case of a so-called Spint-type field emission electron-emitting device with a gate electrode and cone-shaped emitter electrodes.

Also the luminescent spot which corresponds to one electron-emitting device described above means the luminescent spot formed by bombardment of the electrons emitted from a single electron-emitting device and has a particular shape.

The shape is determined here as follows.

Namely, electrons are emitted from the electron-emitting device in question. It must be ensured that other electron-emitting devices will not emit electrons or cause so many electrons as to produce visible light to reach the irradiated member.

The drive conditions used when prescribing the luminescent spot formed by the electrons from the electron-emitting device in question should be the standard drive conditions used when forming images by the image display apparatus.

Regarding modulation conditions in the standard drive conditions, if modulation for image formation is carried out by simply turning on and off the electron-emitting device (including pulse width modulation), the condition which turns on the electron-emitting device should be used, and if three- or higher-value peak-to-peak modulation is involved, the condition required to obtain the middle gradation between the lowest gradation (O gradation) and highest gradation should be used.

In a configuration in which modulation is performed by controlling the flight of electrons with a grid electrode or the like which modulates the flight of electrons instead of controlling the electron emission of the electron-emitting device itself, if modulation for image formation is performed by simply turning on and off the electron-emitting device (including pulse width modulation), the condition which turns on the electron-emitting device should be used, and if three- or higher-value peak-to-peak modulation is involved, the condition required to obtain the middle gradation between the lowest gradation (0 gradation) and highest gradation should be used.

Under these conditions, an area which contains a portion glowing under bombardment by the electrons from the electron-emitting device in question should be photographed by a CCD camera under magnification. From the resulting data, data obtained under the same conditions except that electron-emitting device is off should be subtracted as the background. The shape thus obtained should be the shape of the luminescent spot.

During actual image display, the luminescent spots formed by individual devices may overlap, but even in that case, the shape of the luminescent spot produced by each device can be determined by the above method. Besides, structures such as black stripes or a black matrix may be placed near the member irradiated by the electron-emitting device, resulting in a chipped luminescent spot. Even in that case, the shape determined by the above method should be used as the shape of the luminescent spot. If luminescent spots are chipped by a black member (black stripe or black matrix), visual unevenness in luminance due to displacement of the luminescent spots and incidental unevenness in luminance due to the chipped luminescent spots present problems. The present invention is especially suitable for use in such situations.

Also, the above-mentioned quantity of light of a luminescent spot, which is measured with a CCD camera, can be determined by integrating the luminance in the shape determined under the above conditions with respect to area and then further integrating the result with respect to a period given to the electron-emitting device which forms the luminescent spot to emit electrons while a single image is formed. (This period is equivalent to a so-called scan period in typical image formation. It many be one line selection period in the case of line-sequential scanning in which electron-emitting devices arranged in a matrix are selected line by line and the electron-emitting devices on a selected line are driven simultaneously.)

The quantity of light can be controlled by controlling the amount of electrons which reach the irradiated member in a unit time or by controlling the length of time during which electrons are traveling to the irradiated member in the above described period.

Specifically, it can be controlled, for example, by controlling the amount of electron emissions from the electron-emitting device in a unit time and the electron emission time during the above described period or by controlling the amount of electrons passing through a grid electrode in a unit time and the passage time of electrons during the above described period.

Thus, the quantity of light of luminescent spot can be controlled by controlling the arrival conditions of electrons from the electron-emitting device for the given luminescent spot to the irradiated member (e.g., the drive conditions of the electron-emitting device or electron passage conditions of the grid electrode).

Incidentally, the above described arrival conditions may be corrected by correcting the amount of electrons arriving (emitted or passing) in a unit time: specifically, by correcting the voltage (or current) applied to the electron-emitting device or grid electrode, by correcting the electron travel (emission or passage) time, or by correcting the duration of application (pulse width) of the voltage applied to the electron-emitting device to make it emit electrons or the electric potential applied to the grid electrode to make it pass electrons.

Also, the interval between luminescent spots described above can be determined by prescribing the shapes of the luminescent spots, determining the center of gravity of each luminescent spot shape (assuming that the shape of a luminescent spot has a uniform mass distribution), and taking the interval between the centers of gravity as the interval between the luminescent spots. Thus, the position of a luminescent spot is the position of the center of gravity.

The present inventors found that the interval between luminescent spots is correlated with visual brightness, looked for a method of reducing visual difference in brightness without making the intervals between luminescent spots uniform, and finally made the invention characterized by making corrections according to the interval between luminescent spots. Furthermore, as a result of active studies conducted to implement the present invention suitably, the present inventors made the following findings. The studies were conducted using six adjacent luminescent spots.

The six luminescent spots were denoted as a first luminescent spot, second luminescent spot, third luminescent spot, fourth luminescent spot, fifth luminescent spot, and sixth luminescent spot starting from one end. On the other hand, electron-emitting devices which emitted electrons to form the luminescent spots were denoted as a first electron-emitting device, second electron-emitting device, third electron-emitting device, fourth electron-emitting device, fifth electron-emitting device, and sixth electron-emitting device, respectively. The first to sixth electron-emitting devices were arranged in sequence at equal intervals.

When the interval between the third and fourth luminescent spots was the smallest of the intervals between adjacent luminescent spots, i.e., the intervals between the first and second luminescent spots, between the second and third luminescent spots, between the third and fourth luminescent spots, between the fourth and fifth luminescent spots, and between the fifth and sixth luminescent spots, and the six luminescent spots were formed such that they would produce the same quantity of light, the third and fourth luminescent spots which had the smallest interval appeared brighter when viewed visually.

When corrections were made to decrease the quantities of light of the third and fourth luminescent spots, the visual difference in brightness was alleviated even though the intervals were not uniform. When corrections were made to decrease the light quantity of only the third or fourth luminescent spot, again the visual difference in brightness was reduced.

On the other hand, when the interval between the third and fourth luminescent spots was the largest of the intervals between adjacent luminescent spots, i.e., the intervals between the first and second luminescent spots, between the second and third luminescent spots, between the third and fourth luminescent spots, between the fourth and fifth luminescent spots, and between the fifth and sixth luminescent spots, and the six luminescent spots were formed such that they would produce the same quantity of light, the third and fourth luminescent spots which had the largest interval appeared dimmer when viewed visually.

When corrections were made to increase the quantities of light of the third and fourth luminescent spots, the visual difference in brightness was alleviated even though the intervals were not uniform. When corrections were made to increase the light quantity of only the third or fourth luminescent spot, again the visual difference in brightness was reduced.

When using an irradiated member which glows in two or more luminescent colors, it is preferable to decide the luminescent spots needing correction and determine the amounts of correction, taking into consideration, at a time, only the luminescent spots which glow in the same color, as a group of luminescent spots to be evaluated. This means evaluating visual unevenness in luminance, deciding the luminescent spots needing correction, and determining the amounts of correction, for each color separately.

When using phosphors which, for example, glow in red, green, and blue (R, G, B), respectively, the embodiment of the present invention is particularly suitable for a configuration in which phosphors which glow in red, green, and blue (or red, blue, and green), respectively, are arranged in sequence in the above described column direction and phosphors which glow in the same color are arranged in the row direction, if the group of luminescent spots to be evaluated are the luminescent spots formed by the phosphors which are arranged in the row direction and glow in the same color. However, visual unevenness in luminance may be evaluated without classifying the luminescent spots by color. In that case, luminance differences among colors should be compensated for before evaluating the visual unevenness in luminance.

For the deflector 4 described above, there are various candidates, among which a spacer for maintaining an interval between the electron source 2 and irradiated member 3 is a major candidate, especially considering pressure resistance under atmospheric pressure.

If a spacer is used, for example, as the deflector 4, it will deflect electron trajectories when charged.

If structural members such as spacers are installed in such a way that all the electrons emitted from all the electron-emitting devices will be affected in the same manner, the effects of different influences on images can be eliminated. Actually, however, it is often difficult to place structural members such as spacers in such a way that the electrons emitted from all the electron-emitting devices will be affected in the same manner.

In that case, it cannot be helped but to place structural members such as spacers in such a way that they will have a greater influence on the trajectories of the electrons emitted from some of the electron-emitting devices.

Specifically, spacers or the like are placed between adjacent electron-emitting devices, but they are placed only in some of the intervals between adjacent electron-emitting devices.

In this case, spacers will have different influences on the trajectories of the electrons emitted from different electron-emitting devices depending on their closeness to the electron-emitting devices. For example, as described later, the existence of spacers or other structural members will change the center of gravity positions of the luminescent spots formed by the electrons emitted from the electron-emitting devices.

Thus, different influences caused by spacers or other structural members on the trajectories of the electrons emitted from different electron-emitting devices can cause variations in the center of gravity positions of the luminescent spots formed by the electrons emitted from the electron-emitting devices.

In contrast, the embodiment of the present invention described above can reduce visual differences in brightness without making the intervals between luminescent spots uniform.

The spacer for maintaining an interval between the electron source 2 and irradiated member 3 can have various configurations. It does not necessarily have to make direct contact with the electron source 2 and irradiated member 3 to maintain an interval between them. For example, if another member such as a grid electrode is provided between the electron source 2 and irradiated member 3, the spacer may be placed between this member and the electron source or between this member and the irradiated member.

Also, the plurality of electron-emitting devices described above may have various layout configurations.

For example, when structural members such as spacers are placed in only part of the intervals between adjacent electron-emitting devices as described above, intervals which contain a structural member such as a spacer (first intervals) need not be equal to intervals which do not contain a structural member such as a spacer (second intervals).

However, it is desirable that first intervals and second intervals are approximately equal. The embodiment of the present invention can suitably reduce visual differences in brightness even when the intervals between electron-emitting devices are equal, and furthermore, even when the intervals between adjacent electron-emitting devices are equal and intervals between adjacent luminescent spots are nonuniform.

Also, as the drive circuit (not shown) described above, it is preferable to use, for example, a circuit which can control the arrival conditions of electrons from a plurality of electron-emitting devices arranged in a matrix to the irradiated member 3.

The term "in a matrix" here means that something is arranged in the row and column directions, where the row direction and column direction are not parallel to each other and, more preferably, are approximately orthogonal to each other.

The arrival conditions of electrons to the irradiated member 3 specifically include the amount of electrons reaching the irradiated member 3 or electron energy entering the irradiated member 3.

To control the arrival conditions of electrons from the electron-emitting devices to the irradiated member 3, matrix control can be used. This involves a configuration in which one row is selected from among a plurality of rows and the arrival conditions of electrons to the irradiated member 3 is controlled from the column direction. Methods for controlling the arrival conditions of electrons to the irradiated member 3 include, for example, controlling the state of electron emission itself or controlling the flight of emitted electrons.

Specifically, one row is selected from among a plurality of rows such that the electron-emitting devices arranged in the selected row can be driven through control from the column direction and that the devices arranged in the other rows cannot be driven through the above described control from the column direction. Then, each of the electron-emitting devices can be driven independently by the above described control from the column direction.

Preferably, the drive circuit for use here will be configured to have a first circuit for selecting the plurality of rows in sequence and a second circuit for giving signals to the electron-emitting devices in the selected row to control electron emission from the column direction.

More particularly, the electron-emitting devices arranged in the row direction should be connected to a row-directional wire, the electron-emitting devices arranged in the column direction should be connected to a column-directional wire, the first circuit should be connected to the row-directional wire, and the second circuit should be connected to the column-directional wire.

An alternative configuration involves selecting one row from among a plurality of rows such that the electron-emitting devices arranged in the selected row will emit electrons while the devices arranged in the other rows will not emit electrons and controlling the arrival conditions of electrons emitted from the electron-emitting devices in the selected row to the irradiated member, from the column direction.

Preferably, the drive circuit for use here will be configured to have a first circuit for selecting the plurality of rows in sequence and making the electron-emitting devices in the selected row emit electrons and a second circuit for giving signals from the column direction to control the flight of the electrons emitted from the electron-emitting devices in the selected row.

More particularly, the electron-emitting devices arranged in the row direction should be connected to a set of wires which provides an electric potential serving as a voltage for electron emission, the first circuit should be connected to this wiring, and the second circuit should be connected to an electrode which has been installed along the above described column direction and controls the flight of electrons, for example, an electrode which has an opening and controls the passage of electrons through this opening.

Also, when making the light quantity correction described above, preferably, means for adjusting the degree of correction is provided.

Such means of adjustment will allow manufacturers, sellers, and users to make corrections so as to get desired conditions.

Incidentally, in the above discussion, mention has been made of decreasing or increasing quantity of light in relation to corrections made to the quantity of light of luminescent spots. However, the corrections are relative. Thus, for example, corrections made so that the quantity of light of a luminescent spot will be smaller include decreasing the quantity of light of the given luminescent spot directly or increasing the quantity of light of other luminescent spots, thereby decreasing the quantity of light of the given luminescent spot in a relative sense.

Also, as described above, these corrections work to make the quantity of light of a luminescent spot unequal to that of other luminescent spots when an original signal before the corrections requests the same quantity of light from the given luminescent spot and luminescent spots to be uncorrected or luminescent spots to be corrected to a lesser degree. Such corrections can be made, for example, by correcting the drive conditions for forming the given luminescent spot.

In a preferred configuration, when an original signal makes a request, for example, to drive the electron-emitting device which emits electrons for forming the given luminescent spot at a certain gradation, this gradation is corrected by a certain number or by a certain rate (for example, the quantity of light will be reduced using the gradation obtained by subtracting 1 from the gradation requested by the original signal or the gradation obtained by subtracting 1% from the gradation requested by the original signal (and then rounding the result)).

This correction methods allows a luminescent spot to be corrected similarly even when an original signal before the corrections requests different luminance from the given luminescent spot and other luminescent spots.

Also, as the electron-emitting device described so far, it is preferable to use a cold cathode electron-emitting device. More preferably, the electron-emitting device emits electrons by means of a cold cathode which applies a voltage between a pair of electrodes.

As the electron-emitting device which emits electrons by applying a voltage between a pair of electrodes, it is preferable to use, for example, a Spint-type field emission electron-emitting device which has a pair of a gate electrode and cone-shaped emitter electrode, MIM type electron-emitting device with a high resistance layer between electrodes, or surface conduction electron-emitting device, as described earlier.

In particular, if a structural member such as a spacer is, for example, a plate type which has the longer dimension in the in-plane direction of the electron source (its substrate), if the electron-emitting device used is a type which emits electrons by applying a voltage between a pair of electrodes, and if electrons are deflected in the in-plane direction of the surface on which the electron-emitting devices are mounted, by the voltage applied between the pair of electrodes (in the case of a configuration which has the pair of electrodes in the same plane; known examples include surface conduction electron-emitting devices and horizontal EF devices), preferably the direction of the voltage between the pair of electrodes is not parallel to the direction normal to the longitudinal direction of a deflector, and more preferably the direction of the voltage between the pair of electrodes is parallel to the longitudinal direction of the deflector.

The embodiment of the present invention is particularly suitable for configurations in which an electron source and irradiated member are formed on substrates which are parallel to each other.

Also, it is particularly suitable for an electron source substrate and irradiated-member substrate with a 5-inch or larger screen (the diagonal of the screen area is 5 inches or larger).

Also, it is particularly suitable for configurations in which the interval between electron source and irradiated member is 1 cm or less.

To accelerate emitted electrons, a configuration in which a 5-kV or higher voltage is applied between electron-emitting devices and an accelerating electrode is preferable. The accelerating electrode is installed preferably near phosphors which glow when irradiated with electrons. The phosphors may double as the accelerating electrode.

Regarding the electron source, it preferably comprises 240 or more electron-emitting devices each in the row and column directions. If images are formed using the three primary colors, it preferably comprises 240×240×3 or more electron-emitting devices.

EXAMPLES

Now description will be given about examples configured more specifically based on the embodiment described so far.

In the examples described below, 240 electron-emitting devices are arranged in the row direction and 240 sets of electron-emitting devices for red, green, and blue (for a total of 720 devices) are arranged in the column direction.

Example 1

Figure 3:
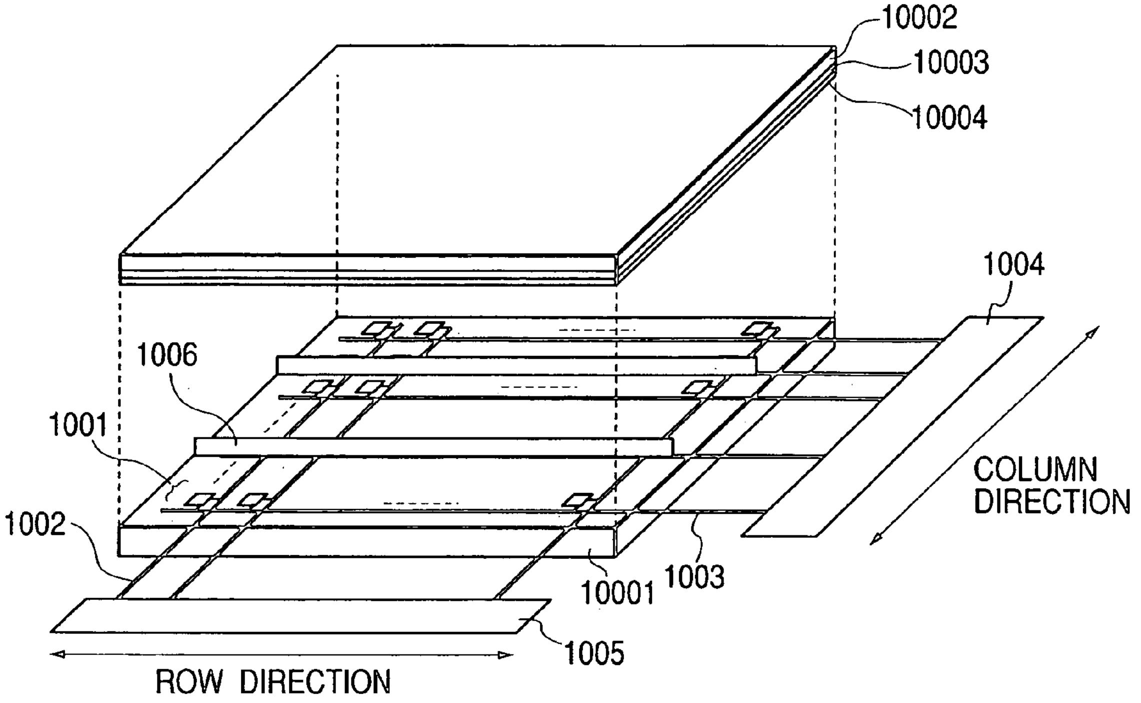
FIG. 3 is a schematic perspective view of an image display apparatus according to a first example of the present invention.
Figure 4:
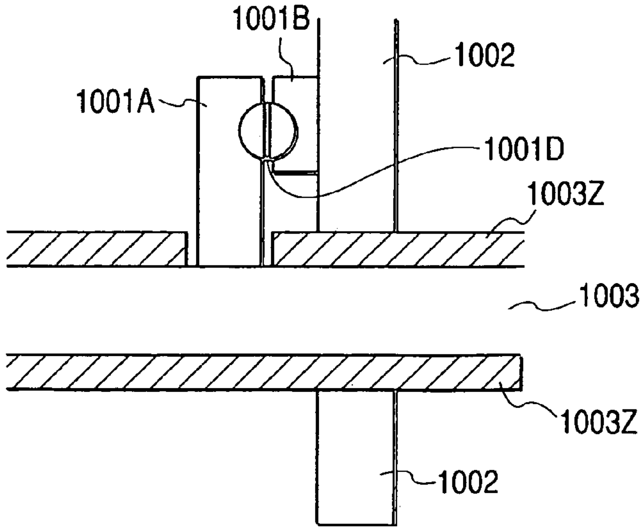
FIG. 4 is a partial plan view of an electron source for an image display apparatus.

An image display apparatus according to a first example of the present invention will be described with reference to FIGS. 3 and 4. FIG. 3 is a schematic perspective view of the image display apparatus according to the first example of the present invention (some parts such as a glass substrate have been lifted for ease of understanding) while FIG. 4 is a partial plan-view of an electron source for the image display apparatus.

According to this example, a surface conduction electron-emitting device is employed as the electron-emitting device equipped with an electron-emitting region and installed in an electron source.

According to this example, on an electron source substrate 10001, 720 surface conduction electron-emitting devices 1001 are arranged in the row direction and connected commonly to a row-directional wire 1003 while 240 surface conduction electron-emitting devices 1001 are arranged in the column direction and connected commonly to a column-directional wire 1002 to form matrix connections as shown in FIG. 3.

A drive circuit consists of a scan circuit (first circuit) 1004 connected with the row-directional wires and a modulation circuit (second circuit) 1005 connected with the column-directional wires.

Besides, on the side opposite to the electron source substrate 10001, a glass substrate 10002, a phosphor 10003 formed on the glass substrate 10002 and serving as an irradiated member, and a metal back 10004 are stacked one on top of another.

Spacers 1006 serving as deflectors are provided between the electron source substrate 10001 and phosphor 10003. They are installed on some of the row-directional wires.

The electron-emitting devices 1001 in the column direction are spaced evenly. Also, in the row direction, adjacent electron-emitting devices 1001 placed on opposite sides of a spacer 1006 and adjacent electron-emitting devices 1001 placed on one side of a spacer 1006 are spaced equally.

A selection signal (selection potential) of −6.5 V is applied to a selected row-directional wire (ground potential of 0 V to non-selected row-directional wires) and a modulating signal (pulse width modulation signal in this case) is applied to the column-directional wires. For the column-directional wires, +6.5 V is used as an on-state potential and the ground potential is used as an off-state potential.

FIG. 4 is an enlarged view in the vicinity of an electron-emitting device 1001 on the electron source substrate 10001.

An insulating layer 1003Z is stacked on the column-directional wire 1002, and the row-directional wire 1003 is further stacked on top of them. The column-directional wire 1002 is connected with a device electrode 1001B which forms the electron-emitting device, the row-directional wire 1003 is connected with a device electrode 1001A which forms the electron-emitting device, and an electron-emitting region 1001D is formed between the device electrode 1001A and device electrode 1001B.

Also, the metal back 10004 consisting of aluminum is installed on a surface of the phosphor 10003 described above. It is used as an accelerating electrode to apply 6 kV according to this example.

Also, the interval between the electron source substrate 10001 and phosphor 10003 is set at 2 mm.

Figure 9:
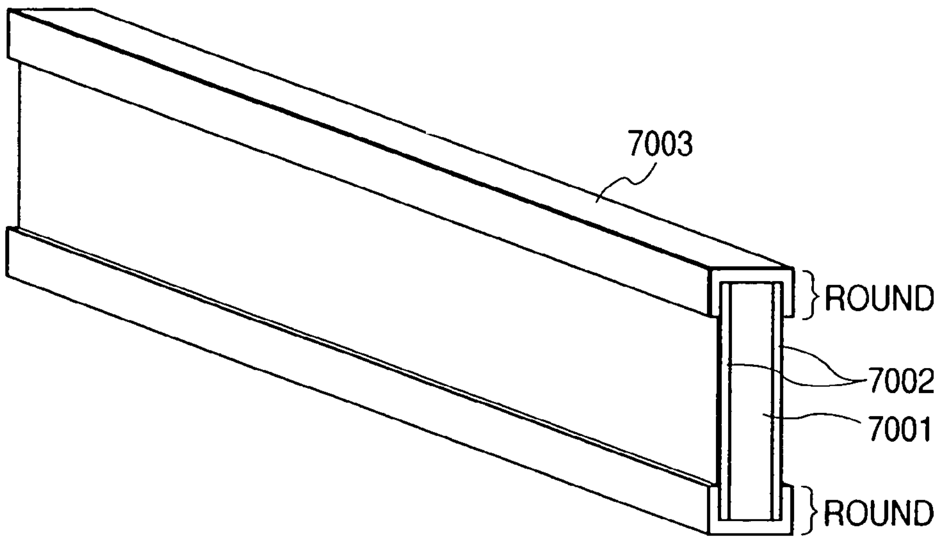
FIG. 9 is a schematic perspective view of a spacer installed in the image display apparatus according to the first example of the present invention.

Next, the spacer will be described with reference to FIG. 9. FIG. 9 is a schematic perspective view of a spacer installed in the image display apparatus according to the first example of the present invention.

The spacer 1006 is electrically connected to the row-directional wire 1003 and metal back 10004. Its surfaces are covered with electroconductive chromic oxide films 7002. Platinum electrodes 7003 have been formed over the part where the spacer 1006 contacts the row-directional wire or metal back 10004.

The electroconductive films 7002 have been sputtered over the base metal 7001 of the spacer. The platinum electrodes 7003 which contact the row-directional wire 1003 and metal back 10004 have also been sputtered.

The platinum electrodes 7003 have been formed sodas not only to cover the edges which contacts the row-directional wire 1003 or metal back 10004, but also to bend around spacer flanks (the sides facing electron trajectories) which are exposed to a vacuum atmosphere.

With the image display apparatus, when uniform standard drive conditions were given to all the electron-emitting devices in sequence so that the entire surface would glow, the locations of the spacers appeared brighter (hereinafter referred to as linear unevenness in luminance).

Then, the center of gravity positions of six luminescent spots in an area which contained a spacer 1006 were observed by the method described earlier. The results are shown in FIG. 5.

Figure 5:
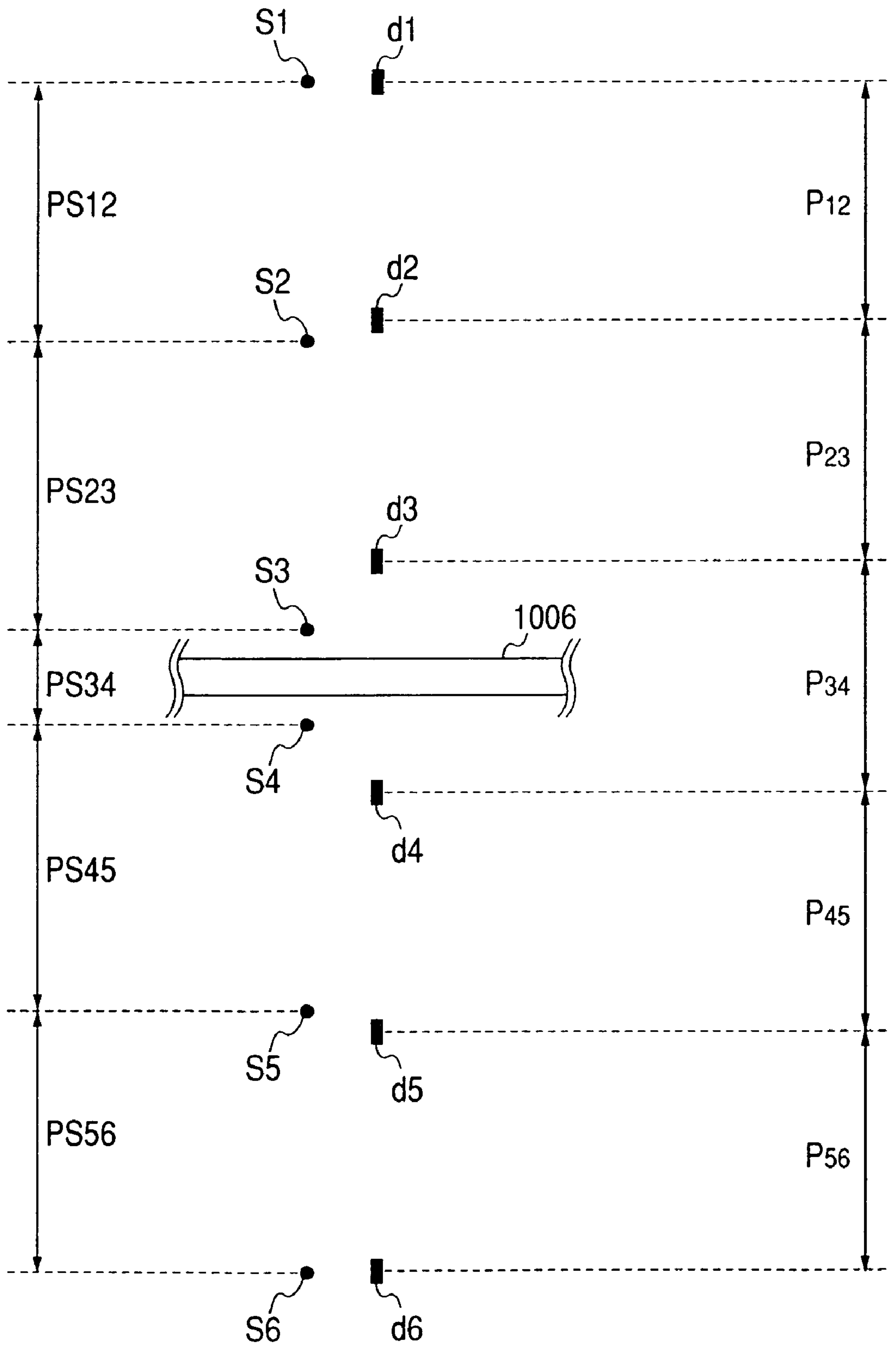
FIG. 5 is a diagram showing arrangement of electron-emitting regions and luminescent spots in relation to each other according to the first example of the present invention.

FIG. 5 schematically shows arrangement of the respective electron-emitting regions 1001D of the six electron-emitting devices d1 to d6. The intervals P12, P23, P34, P45, and P56 are equal.

On the other hand, reference characters S1 to S6 indicate relative center of gravity positions of the luminescent spots formed by the respective electron-emitting devices.

According to this example, intervals PS12, PS23, PS34, PS45, and PS56 between adjacent luminescent spots are not equal. In particular, PS34 is much smaller than other intervals.

Thus, in this example, a correction was made to a drive condition of the electron-emitting devices which emit electrons for forming luminescent spots S3 and S4. Specifically, the length of the pulse width modulation signal applied to the electron-emitting devices to emit electrons was cut by 40%.

As a result of this correction, a bright line (brighter portion) near the spacer became inconspicuous.

Figure 6:
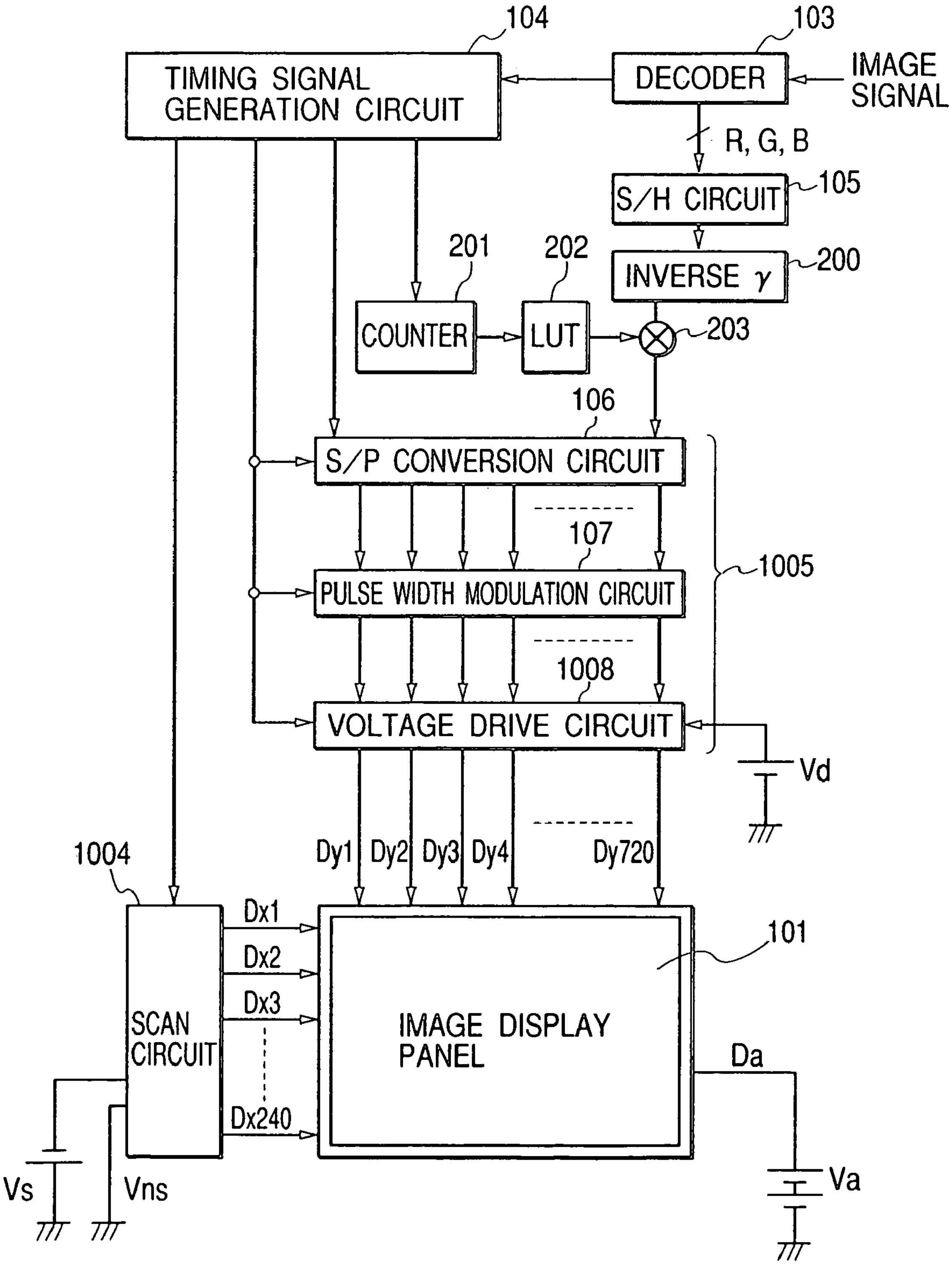
FIG. 6 is a block diagram of the image display apparatus, including a drive circuit, according to the first example of the present invention.

Now, a drive circuit for making corrections to quantity of light will be described with reference to FIG. 6. FIG. 6 is a block diagram of the image display apparatus, including the drive circuit, according to the first example of the present invention.

In FIG. 6, reference numeral 101 denotes an image display panel employing surface conduction electron-emitting devices. The panel is connected to external electric circuits via terminals Dx1 to Dxm connected to row-directional wires 1003 and via Dy1 to Dyn connected to column-directional wires 1002.

Also, a high voltage terminal Da on the image display panel 101 is connected to an external high voltage power supply Va so that an electric potential for accelerating emitted electrons will be applied to it. A scan signal is applied to the terminals Dx1 to Dxm to drive, row by row, the surface conduction electron-emitting devices matrix-wired on a multi-electron-beam source mounted in the panel.

On the other hand, a modulating signal is applied to the terminals Dy1 to Dyn to control electron beams output from the surface conduction electron-emitting devices in the row selected by the scan signal described above.

Next, the scan circuit 1004 will be described.

The scan circuit 1004 contains 240 switching elements corresponding to the row wires. Each of the switching elements selects either a selection voltage Vs or non-selection voltage Vns to switch electrical connection to respective terminals Dx1 to Dx240 of the display panel 101.

The selection potential Vs and non-selection potential Vns are provided by an external power supply. Each switching element operates based on a scan start signal and scan clock outputted by a timing signal generator circuit 104, but actually these functions can be implemented easily by combining switching elements such as FETs.

Next, a flow of an image signal will be described. A decoder 103 separates an incoming composite image signal into a luminance signal of the three primary colors (RGB) and horizontal and vertical synchronizing signals (HSYNC and VSYNC). The timing signal generator circuit 104 generates various timing signals, including a sampling clock, scan start signal, scan clock, and pulse width clock, in sync with the HSYNC and VSYNC signals. The RGB luminance signal is sampled and retained in an S/H circuit 105 by the sampling clock generated by the timing signal generator 104.

The retained signal undergoes inverse gamma conversion in an inverse gamma conversion circuit 200. This example uses pulse width modulation, and gradation characteristics are substantially linear. Incoming TV signals have been corrected for gradation characteristics of the CRT, and thus this example uses inverse gamma conversion to recover the original signal from the gamma-corrected signal.

In the figure, reference numeral 201 denotes a counter. Upon receiving various timing signals generated by the timing signal generator 104, this counter generates a signal indicating the row to be driven and gives it to LUT 202. LUT 202 is a memory which constitutes a correction circuit for performing the light quantity correction described above.

LUT 202 stores the correction values described above (the gradation value is reduced by 40% when driving the electron-emitting devices nearest to the spacer) and outputs the correction value for the row indicated by the counter 201 to a multiplier 203, which then multiplies the image signal by the correction value and outputs the corrected image signal. This example corrects the linear unevenness in luminance by changing the image signal.

The corrected signal is converted by a serial/parallel (S/P) conversion circuit 106 into parallel signals arranged in the order which corresponds to the arrangement of phosphors on an image-forming panel.

Then, a pulse width modulation circuit 107 generates pulses with pulse width corresponding to image signal strength. A voltage drive circuit 1008 outputs a predetermined electric potential (+6.5 V) for the duration of the pulse width. The electron-emitting devices of the display panel are simple-matrix driven by a signal outputted by the scan circuit 1004 described above and a signal from the voltage drive circuit 1008.

Although this example employs a method which involves multiplying the image signal by a correction value, this is not restrictive. Another correction method such as inverse gamma conversion described in relation to this example may be used in conjunction. In that case, it is preferable to use a common correction circuit for the other correction and the luminance correction in accordance with intervals between luminescent spots which is directly relevant to the present invention. If inverse gamma conversion is used in conjunction, for example, an inverse gamma conversion table should contain data for the correction in accordance with intervals between luminescent spots.

Instead of a method which changes image signals, any other method may be used as long as it provides luminance in accordance with correction values.

The above correction alleviated visual differences in visual luminance and made the bright line near the spacer inconspicuous.

Example 2

This example is the same as the first example except that the spacer has a different configuration.

In the first example, the platinum electrodes over that edge of the spacer which contacts the row-directional wire and that edge of the spacer which contacts the metal back bend around the flanks, as described above.

In contrast, according to this example, the platinum electrode over the edge in contact with the row-directional wire and the platinum electrode over the edge in contact with the metal back have no round to cover the flanks.

With this configuration, an image was formed under the standard conditions. The location of the spacer appeared dark when viewed visually. Incidentally, since the spacer also extended in the row direction according to this example, a dark line was observed along it.

Then, the center of gravity positions of six luminescent spots in an area which contained the spacer 1006 were observed by the method described earlier. The results are shown in FIG. 7.

Figure 7:
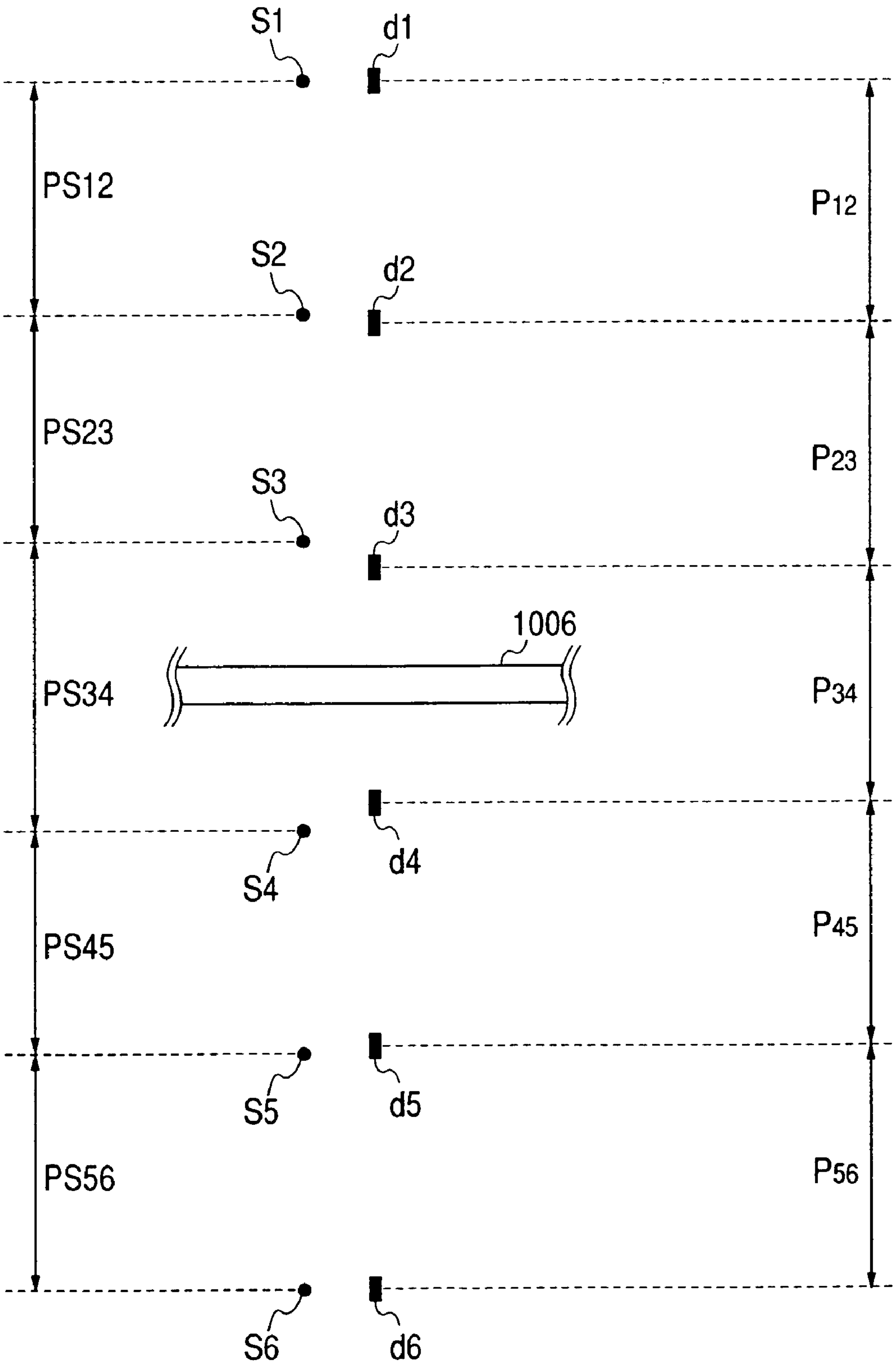
FIG. 7 is a diagram showing arrangement of electron-emitting regions and luminescent spots in relation to each other according to a second example of the present invention.

FIG. 7 schematically shows arrangement of the respective electron-emitting regions 1001D of the six electron-emitting devices d1 to d6. The intervals P12, P23, P34, P45, and P56 are equal.

On the other hand, reference characters S1 to S6 indicate relative center of gravity positions of the luminescent spots formed by the respective electron-emitting devices.

According to this example, intervals PS12, PS23, PS34, PS45, and PS56 between adjacent luminescent spots are not equal. In particular, PS34 is much larger than other intervals.

Thus, in this example, a correction was made to a drive condition of the electron-emitting devices which emit electrons for forming luminescent spots S3 and S4. Specifically, the length of the pulse width modulation signal applied to the electron-emitting devices to emit electrons was increased by 40% in a relative sense by decreasing the length of the pulse width modulation signal applied to the other electron-emitting devices at a designated rate.

As a result of this correction, a dark line (darker portion) near the spacer became inconspicuous.

Example 3

Figure 8:
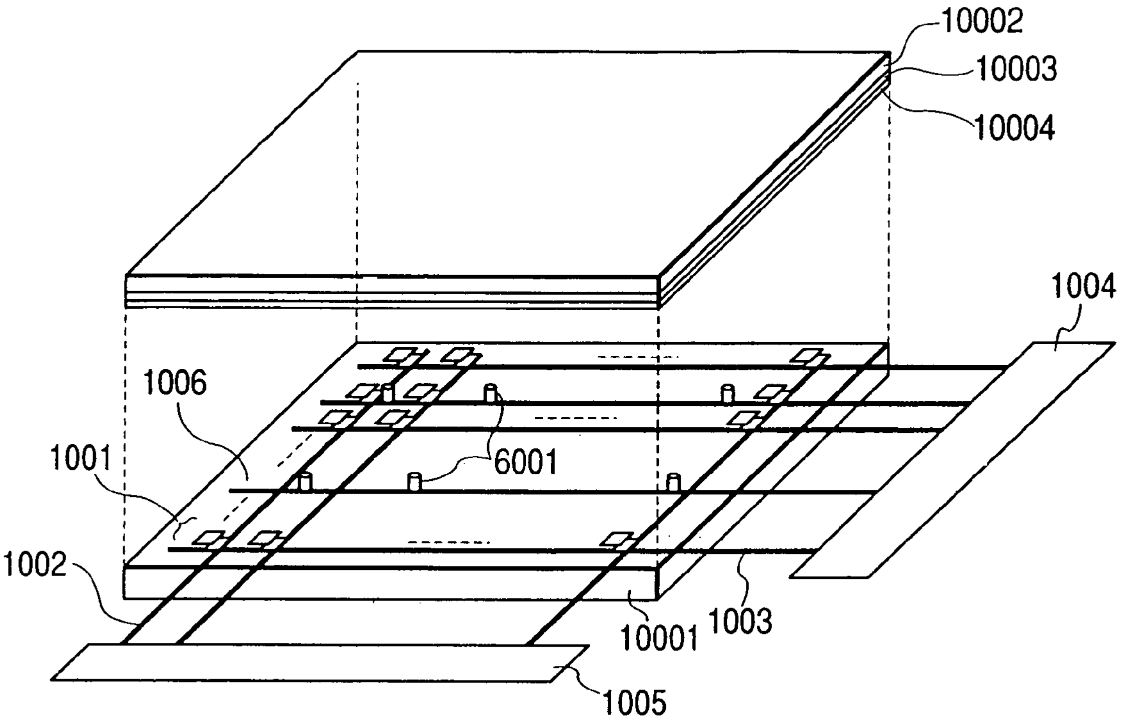
FIG. 8 is a schematic perspective view of an image display apparatus according to a third example of the present invention.

The methods described in the first and second examples have many variations. For example, the present inventions can be applied suitably even to configurations in which columnar spacers are installed perpendicularly to the electron source substrate and phosphor. The configuration is shown in FIG. 8. FIG. 8 is a schematic perspective view of an image display apparatus according to a third example of the present invention.

The configuration in FIG. 8 uses columnar spacers 6001 instead of the spacers 1006 in FIG. 3.

In this configuration, the effect of the spacer differs again between the trajectories of the electrons emitted from the electron-emitting devices nearest to the spacer 6001 and the trajectories of the electrons emitted from the other electron-emitting devices. This configuration can also reduce unevenness in luminance using the method described in the first or second example.

However, whereas the same correction value can be used for all the electron-emitting devices connected to the same row wire in the first and second examples, each of the electron-emitting devices connected to the same row wire has a different distance from the nearest spacer according to the third example.

Thus, concerning each of the electron-emitting devices connected to the same row wire, it is necessary to determine whether and to what extent correction is necessary and store this information in LUT 202, which is a correction value memory.

The present invention has been described above, citing examples, but concrete circuit configuration for implementing the present invention is not limited to the one shown in FIG. 6.

The following layout configurations can be used in combination with each of the examples described above. In view of the effect of spacers on electron trajectories, a circuit configuration suitable for a spacer layout can be selected.

Concrete description will be provided below.

Example 4

Figure 10:
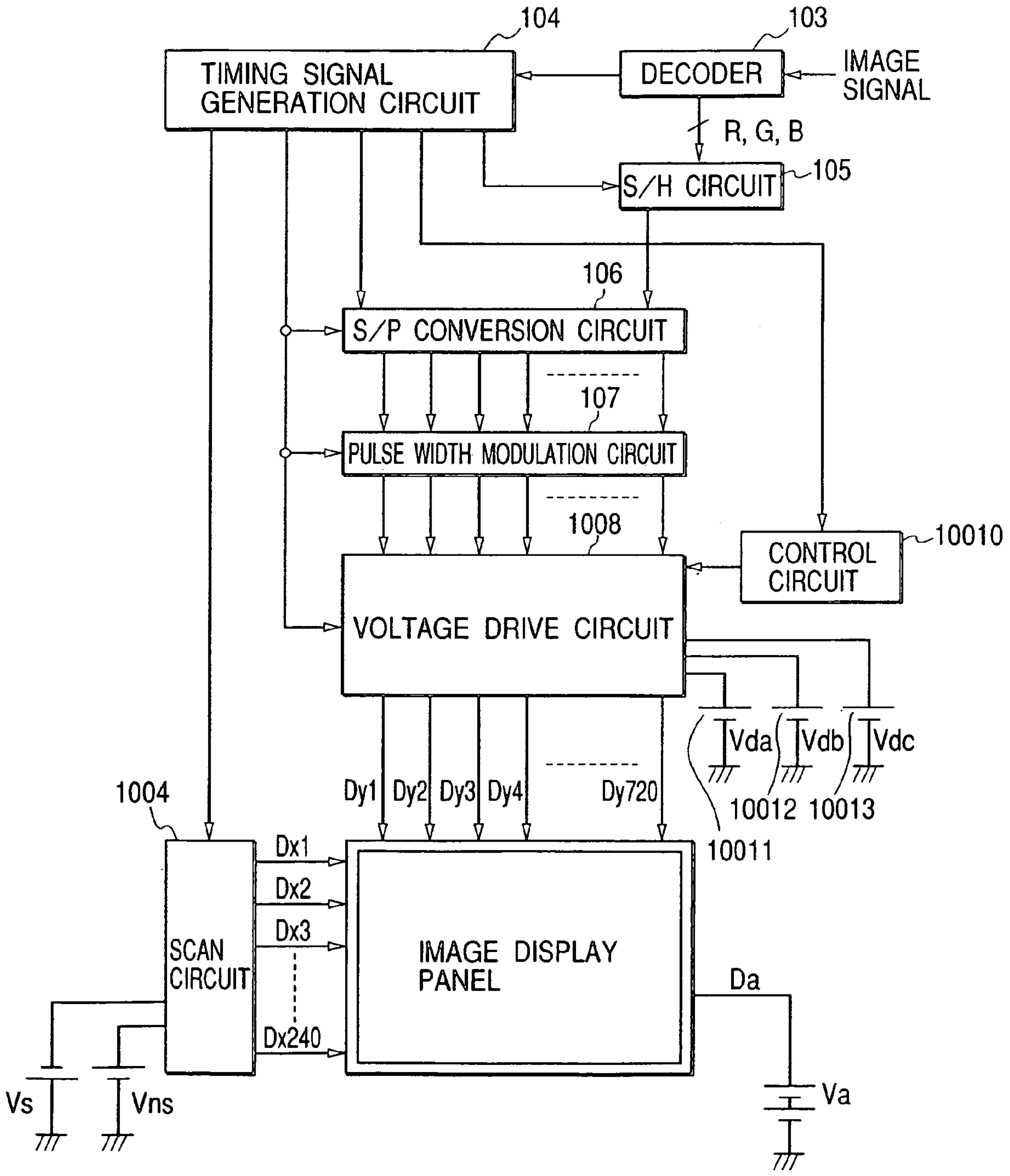
FIG. 10 is a block diagram of an image display apparatus, including a drive circuit, according to a fourth example of the present invention.

FIG. 10 shows a configuration, including a control circuit, according to this example. The components with equivalent functions as those in FIG. 6 are denoted by the same reference numerals as those in FIG. 6.

In the configuration of FIG. 6, in which pulse width modulation is carried out to realize gradation display, the light quantity correction according to the present invention is performed through correction of the signal which determines pulse width. In the fourth example, gradation display is realized by means of pulse width modulation and the quantity of light is corrected through adjustment of crest values (pulse heights) of the pulse width modulation signal.

In this configuration, the pulse width modulation circuit 107 generates pulse width modulation signals not corrected for visual unevenness in luminance according to intervals between luminescent spots.

The voltage drive circuit 1008 according to this example contains a shift register and retains the drive conditions for the column-directional wires of all the columns by sequentially shifting the drive condition for each column-directional wire, which is received from a control circuit 10010, by a sampling clock outputted from the timing signal generator 104. It selects a drive potential from among Vda to Vdc according to the drive condition retained for each column. Vda is selected for condition a, Vdb is selected for condition b, and Vdc is selected for condition c. Then, it applies the selected drive potential to the surface conduction electron-emitting devices via the terminals Dy1 to Dy720 in the display panel 101 for the duration of the pulse outputted from the pulse width modulation circuit 107 according to a pulse width clock outputted from the timing signal generator 104.

Figure 11A:
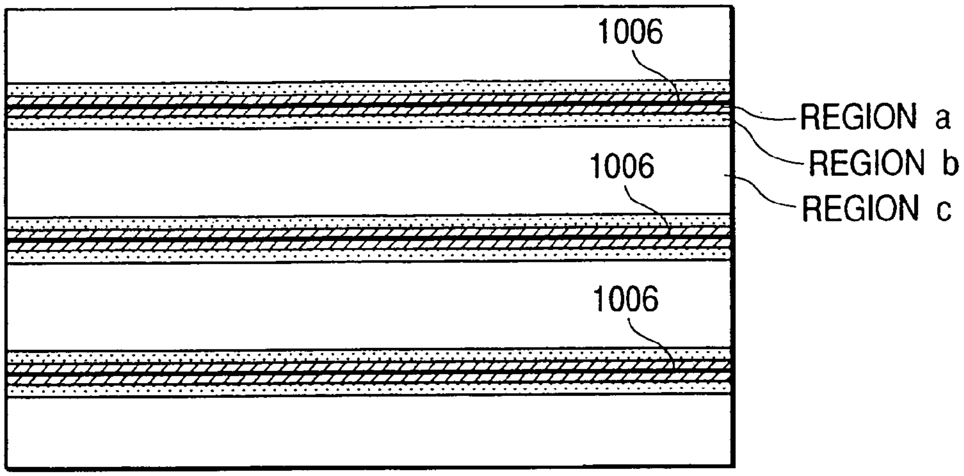
FIGS. 11A, 11B, and 11C are diagrams showing relationships between locations of spacers illustrated by the fourth example of the present invention and regions which are subject to light quantity control.
Figure 11B:
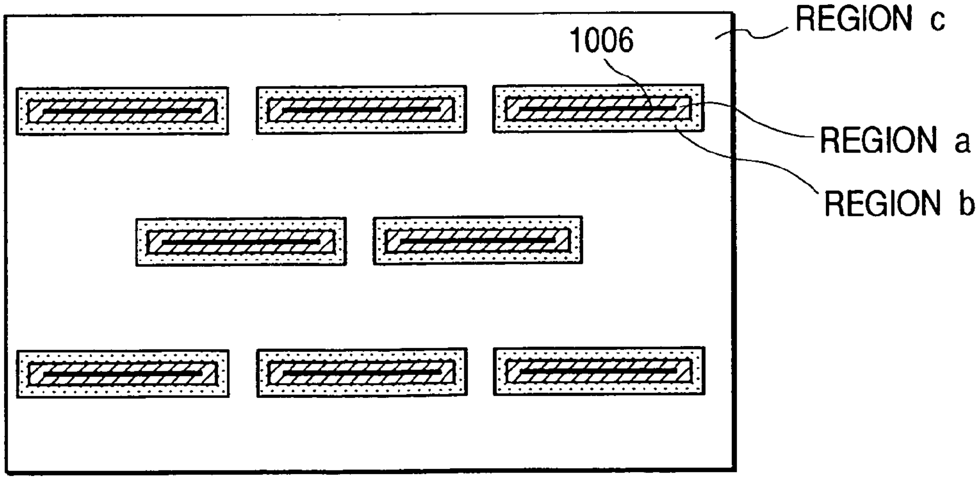
Figure 11C:
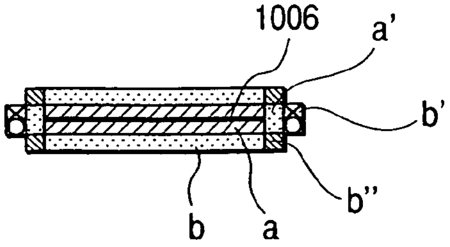

The control circuit 10010 receives various clock signals generated by the timing signal generator 104, generates drive conditions for the devices to be driven, and gives them to the voltage drive circuit 1008. FIGS. 11A to 11C are plan views showing spacer layouts in the display panel according to this example: the devices nearest to the spacer are represented by region a, the second nearest devices by region b, and other devices by region c. In FIG. 11A, the spacers 1006 are arranged continuously along row-directional wires. Incidentally, although three lines of spacers are shown in the figure for simplicity of illustration, an appropriate number of spacers are provided actually to make the image display apparatus resistant to atmospheric pressure.

Figure 12A:
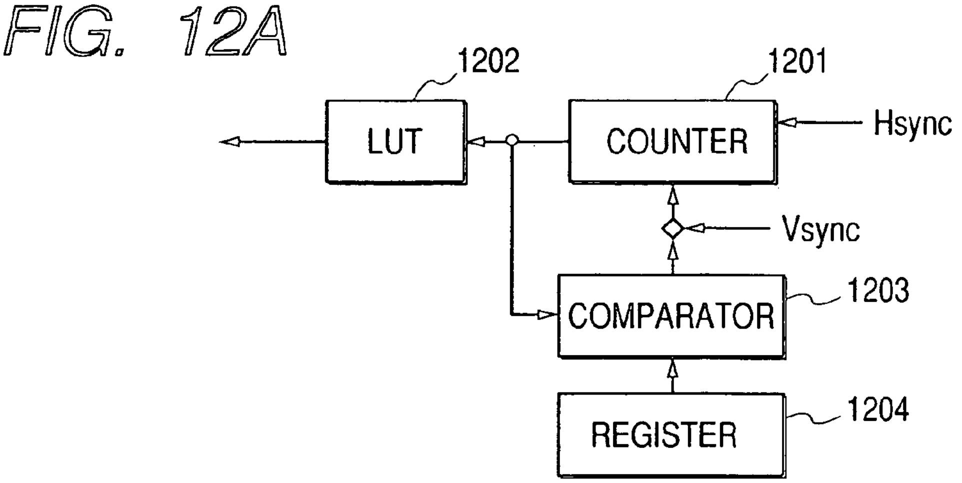
FIGS. 12A, 12B, 12C and 12D are diagrams showing configuration examples of a control circuit illustrated by the fourth example of the present invention.

Configuration examples of the control circuit 10010 are shown in FIGS. 12A to 12D. The configuration in FIG. 12A is suitable for a situation in which spacers are arranged continuously along row-directional wires, as in the case of FIG. 11A.

In the figure, reference numeral 1201 denotes a counter, which counts HSYNC generated by the timing signal generator 104 and thereby generates the row number of the devices to be driven. Reference numeral 1202 denotes a lookup table (LUT), which receives, as input, the row number outputted by the counter 1201 and outputs a signal representing a region. Exemplary contents of LUT 1202 is shown in FIG. 13, in which spacers are arranged in every 24 rows and the first spacer is placed between the 11th and 12th rows. The region a nearest to the spacer corresponds to the 11th and 12th rows, for which 2 is output representing drive condition a. The second nearest region b corresponds to the 10th and 13th rows, for which 1 is output representing drive condition b. The other region c corresponds to the 0th to 9th and 14th to 23rd rows, for which 0 is output representing drive condition c. The drive condition signals are output from the control circuit 10010 and given to the voltage drive circuit 1008.

Reference numeral 1203 denotes a comparator, which compares the output of the counter 1201 with the number of rows that represents the intervals between spacers (23 in this example) and that is retained by a register 1204, and resets the counter 1201 if they match. The comparator output is ORed with the vertical synchronizing signal VSYNC before it is input in a counter reset terminal. Incidentally, the register 1204 used here may be replaced by a memory, switches, or the like.

Figure 12B:
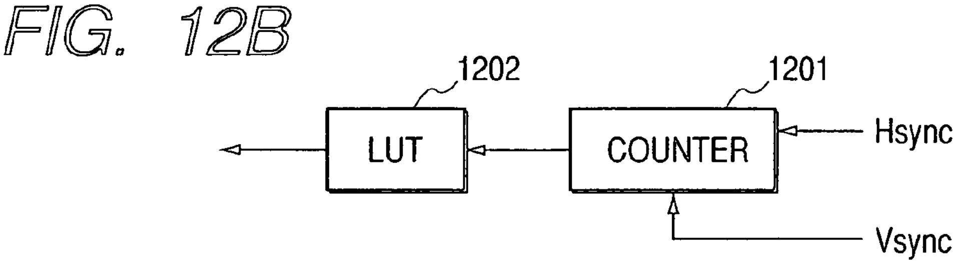

In particular, if spacers serving as deflectors are placed at intervals of rows equal to the nth power of 2, the configuration shown in FIG. 12B can be used. If the counter 1201 is an n-bit counter, it can be reset without a comparator. It can be reset only by a VSYNC input to perform desired operations.

Figure 12C:
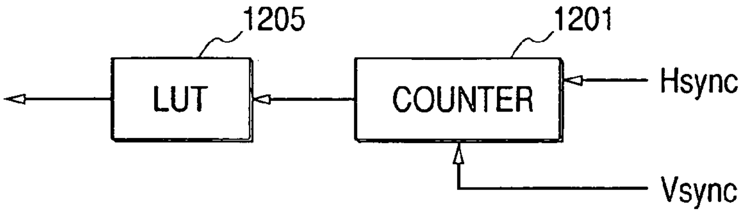

If spacers are not placed at regular intervals of rows, the configuration in FIG. 12C is suitable. The counter 1201 has enough bits for the number (m) of row-directional wires and counts HSYNC beginning at VSYNC. LUT 1205 has enough space for the number (m) of row-directional wires and receives, as input, the row number outputted by the counter 1201 and outputs a signal representing a drive condition.

Figure 12D:
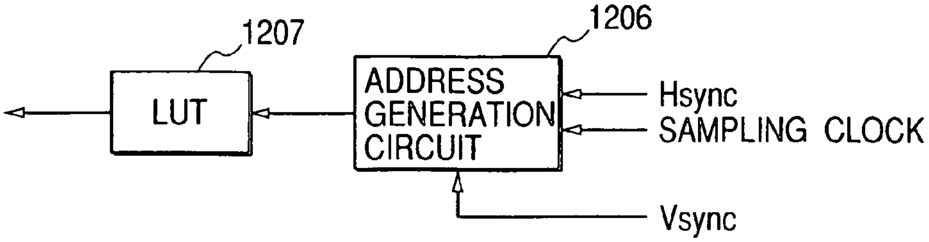
Figure 14:
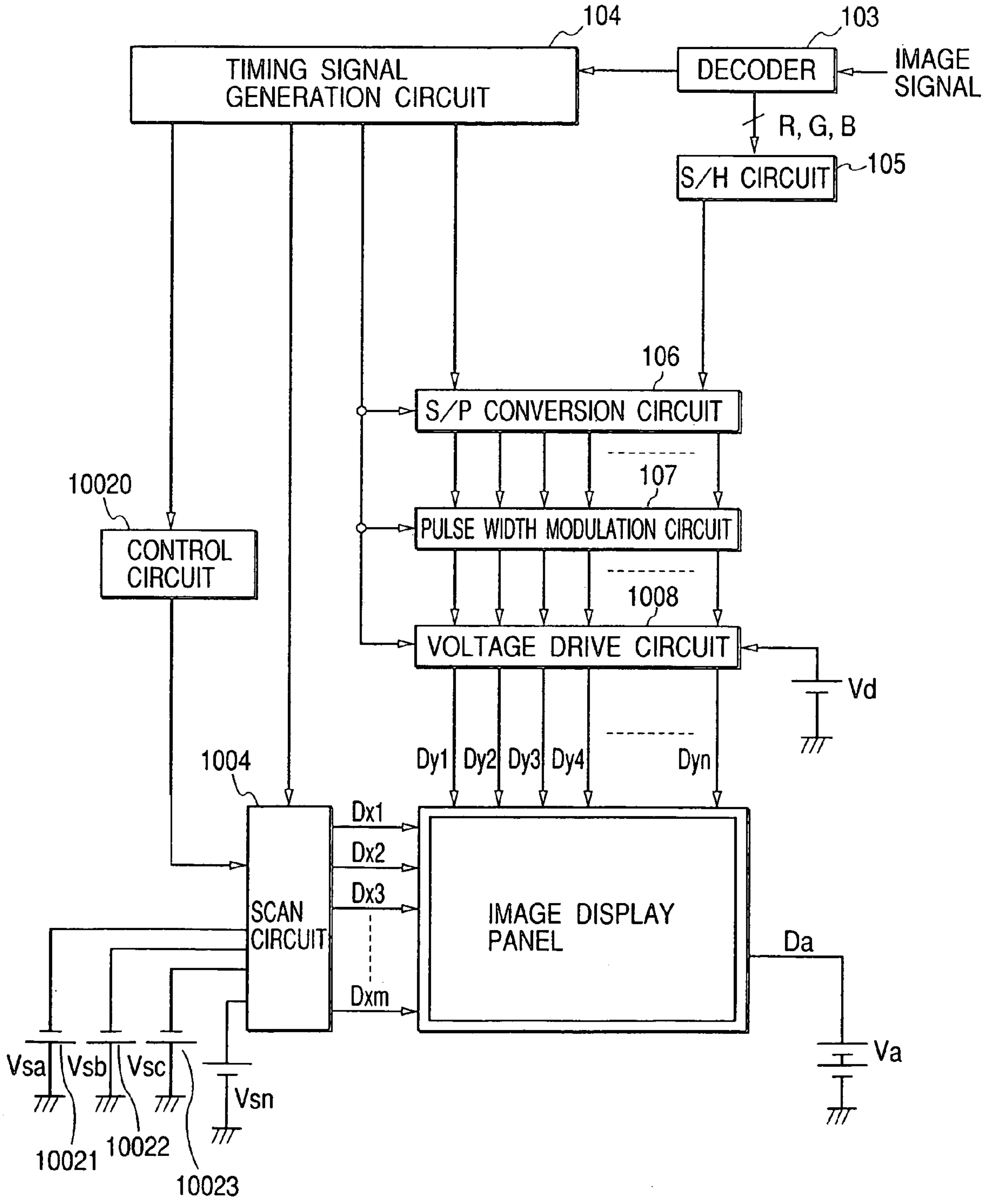
FIG. 14 is a block diagram of an image display apparatus, including a drive circuit, according to a fifth example of the present invention.
Figure 15:
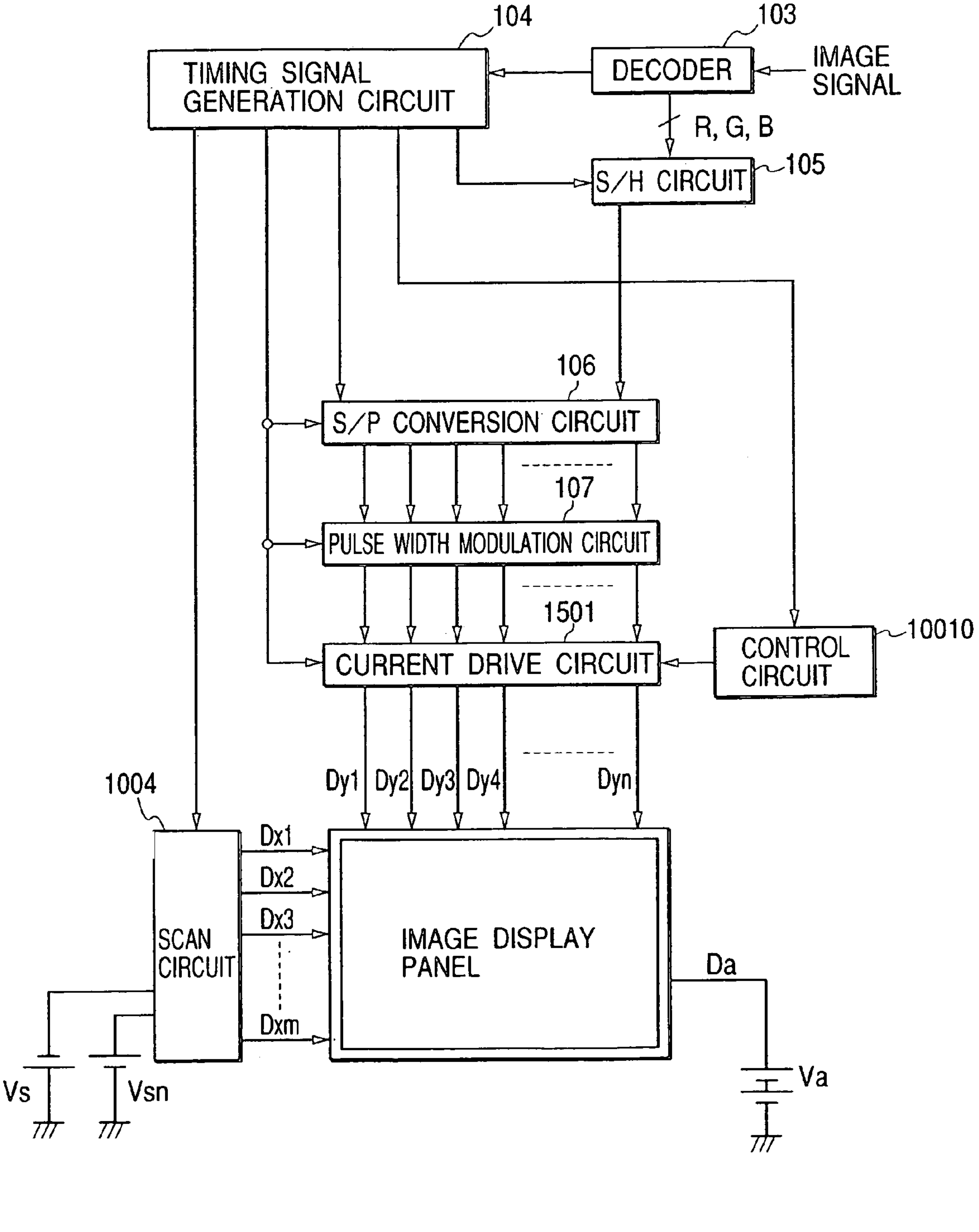
FIG. 15 is a block diagram of an image display apparatus, including a drive circuit, according to a sixth example of the present invention.

In the example of FIG. 11B, spacers are arranged in a staggered manner and are not uniform in the row direction. A configuration of the control circuit 10010 suitable for this arrangement is shown in FIG. 12D. Reference numeral 1206 denotes an address generator circuit, which generates address signals for LUT 1207 based on VSYNC, HSYNC, and a sampling clock generated by the timing signal generator 104. LUT 1207 has enough space for the number (n×m) of surface conduction electron-emitting devices of the display panel 101. It stores data which represents drive conditions a to c for the devices based on intervals between luminescent spots. It is accessed by address signals output by the address generator circuit 1206 and generates a drive condition signal for each device.

Although regions are classified into a to c in the above example, the number of regions is not limited to three.

FIG. 11C shows a spacer and its surrounding area. The entire area is classified into regions a, a', b, b', b", and c according to different intervals between luminescent spots, which require different amounts of correction. The regions, intended to establish different corrective conditions for different intervals between luminescent spots, are determined as follows: a row-directional reference interval and column-directional reference interval are determined assuming that luminescent spots are arranged at regular intervals in the row and column directions over the entire area of the screen, and based on deviations from the reference intervals, actual intervals between luminescent spots are classified into groups which correspond to the regions. Along the length of the spacer, a region which contains the devices nearest to the spacer is designated as region a, a region which contains the second nearest devices is designated as region b, a region which contains the devices in contact with an edge of the spacer and nearest to the spacer is designated as region a', the region which contains the second nearest devices in contact with an edge of the spacer is designated as region b', a region which contains the devices in contact with regions b and a' and located at an oblique angle to the spacer is designated as region b". Region c, which is not shown, contains the other devices. In this way, regions are classified according to the extent to which visual unevenness in luminance is caused by uneven intervals between luminescent spots due to displacement of luminescent spots. The configuration of the control circuit 10010 in FIG. 12D can be used here again.

The terminals Dy1 to Dy720 contain pulse widths modulated according to desired gradations. On the panel supplied with a voltage pulse signal with an electric potential selected for light quantity correction according to intervals between luminescent spots, only the surface conduction electron-emitting devices connected to the row selected by a scan circuit 102 emit electrons for a period which corresponds to the pulse width supplied by the potential difference between the selection potential and the electric potential of the voltage pulse signal. This causes the phosphors to glow. Thus, during one scan period (1H), the devices on the selected row glow according to an image luminance signal. As the rows are selected by the scan circuit 102 and scanned sequentially from the 1st to 240th rows, the panel forms a two-dimensional image.

The above is an outline of operation for image formation according to this example.

There may be a case in which the interval between a given luminescent spot and one of its adjacent luminescent spots is smaller than the reference interval and the interval between the given luminescent spot and the adjacent luminescent spot on the opposite side is larger than the reference interval. Basically, however, corrections can be made taking into consideration the interval which has the larger influence. In particular, if a deflector is present, the interval between two adjacent luminescent spots (luminescent spots A and B) on opposite sides of the deflector tends to have a larger amount of displacement from the reference interval than do the interval between the luminescent spot A and its other adjacent luminescent spot C located on the opposite side from the luminescent spot B. In that case, the quantity of light of luminescent spot A can be corrected based on its distance from the luminescent spot B. According to this example, a good image was obtained when Vda, Vdb, and Vdc were set such that the difference between Vda and Vs would be larger than the difference between Vdb and Vs while the difference between Vdb and Vs would be larger than the difference between Vdc and Vs.

Besides, the drive condition which is given by the control circuit 10010 to the voltage drive circuit 1008 may take the form of a preset voltage (e.g., 8-bit binary number), a signal which will provide a designated potential when subjected to D/A conversion. In that case, the voltage drive circuit 1008 will be equipped with a D/A converter for each of the columns which correspond to the terminals Dy1 to Dy720 of the display panel, will obtain a drive potential by converting the preset voltage received from the control circuit 10010 from digital to analog form, and will apply it to the row wires.

Example 5

This example differs from the fourth example in that whereas in the fourth example, the potential of the modulating signal to be applied to the electron-emitting devices connected to a selected row wire is adjusted to correct quantity of light according to intervals between luminescent spots, in this example, the preset potential inputted in the voltage drive circuit 1008 is kept constant and an electric potential to be applied from the scan circuit is selected for light quantity correction.

Incidentally, according to this example, spacers are arranged continuously along row-directional wires, as in the case of FIG. 11A.

Reference numeral 10020 denotes a control circuit, which receives various timing signals generated by the timing signal generator 104, generates a drive condition for the row wire to be selected, and gives it to the scan circuit 1004. The configurations shown in FIGS. 12A, 12B, and 12C are suitable for the control circuit 10020.

The scan circuit 1004 according to this example has approximately the same configuration as that of the fourth example. It differs only in that aside from the power supply Vns which supplies the non-selection potential, selection-potential power supplies 10021, 10022, and 10023 are connected to supply respective selection potentials Vsa, Vsb, and Vsc which correspond to regions a to c. The scan circuit 1004 according to this example provides a selection potential which corresponds to the row wire to be selected, according to the drive condition provided by the control circuit 10020.

Favorable image display was realized as the values of Vsa, Vsb, and Vsc were set such that the difference between Vsa and the on-state potential applied to column wires would be larger than the difference between Vsa and the on-state potential, which in turn would be larger than the difference between Vsc and the on-state potential.

Example 6

In the examples described above, when a modulating signal is applied to column wires, its potential is set at a designated value. In this example, however, when a modulating signal is applied to column wires, its current is set at a designated value.

The configuration of this example differs from that of FIG. 10 in that this example uses preset current values (8-bit binary number in this example), which are signals for setting the current values of the signals applied to column wires by the control circuit 10010, and that it uses a current drive circuit 1501 instead of the voltage drive circuit 1008.

The current drive circuit 1501 contains a shift register and retains the drive conditions for the column-directional wires of all the columns by sequentially shifting a preset current value, which is the drive condition for each column-directional wire and which is received from the control circuit 10010, by a sampling clock outputted from the timing signal generator 104. The current drive circuit 1501 is equipped with a D/A converter for each of the columns which correspond to the terminals Dy1 to Dy720 of the display panel to convert the preset current value received from a control circuit 10010 from digital to analog form. Then, it delivers the drive current obtained by D/A conversion to the surface conduction electron-emitting devices via the terminals Dy1 to Dy720 in the display panel 101 for the duration of the pulse outputted from the pulse width modulation circuit 107 according to a pulse width clock outputted from the timing signal generator 104.

According to this example, the drive conditions output by the control circuit 10010 are preset current values, but drive conditions a to c may be used instead. In that case, the current drive circuit 1501 selects a reference voltage from among Vda to Vdc to obtain a drive current which corresponds to the drive condition retained for each column. Vda is selected for condition a, Vdb is selected for condition b, and Vdc is selected for condition c, and respective drive currents Ida to Idc generated by using the above reference voltages are applied to the devices. Preset current value Ida which corresponds to region a is the largest and current value Idc which corresponds to region c is the smallest.

According to this example, the electric potential applied to column wires to deliver the preset current values to the column wires is higher than the selection potential, causing current to flow from the current drive circuit to the column wires, but in a configuration in which the electric potential applied to a selected column wire is set higher than the electric potential applied to the other column wires, current flows from the column wires to the current drive circuit. In that case, the current drive circuit will be of a draw type.

Example 7

The example described above involves pulse width modulation. This example involves amplitude (peak-to-peak) modulation. Incidentally, light quantity correction is also performed through adjustment of crest values.

Figure 16:
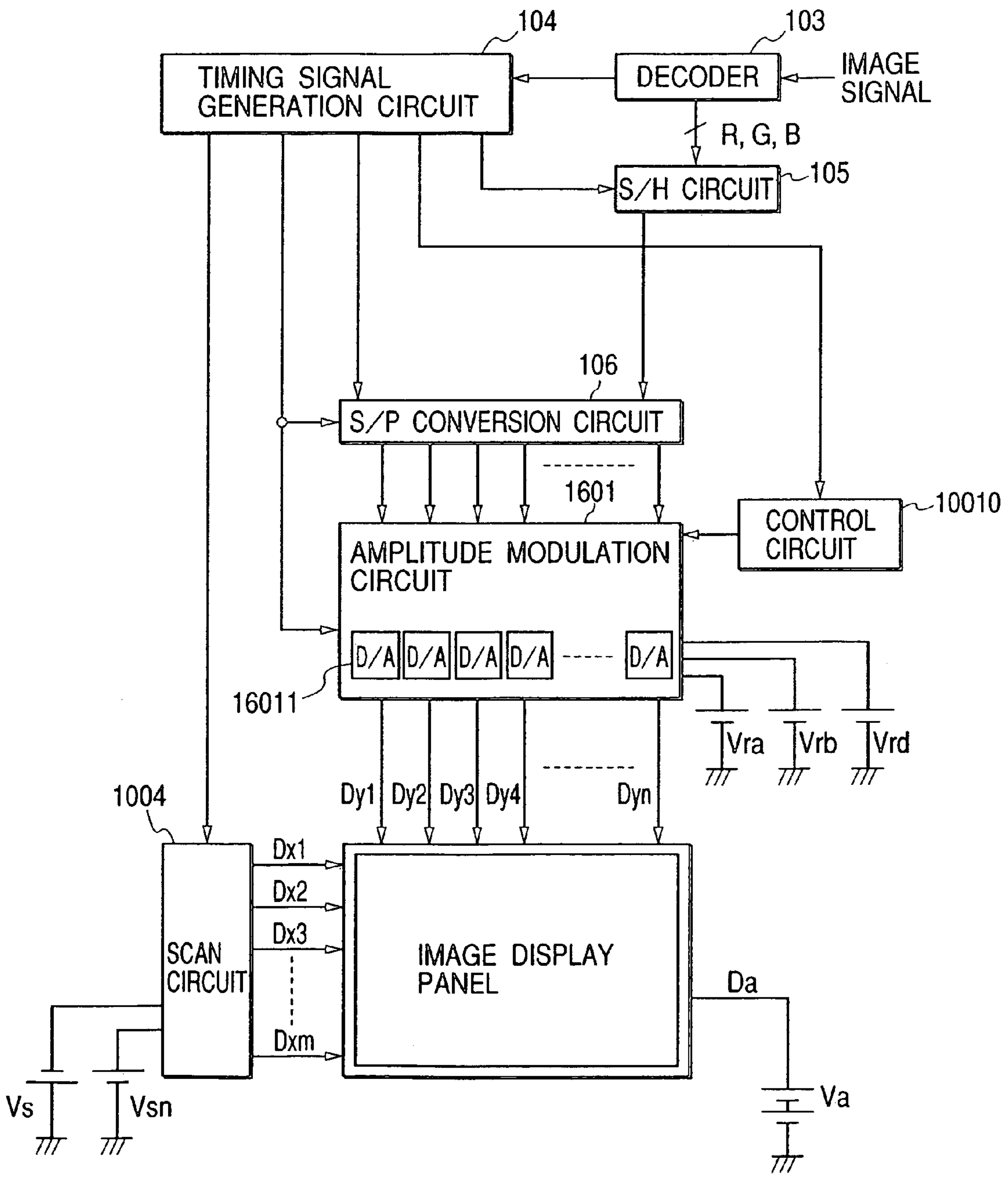
FIG. 16 is a block diagram of an image display apparatus, including a drive circuit, according to a seventh example of the present invention.

The configuration of this example is shown in FIG. 16. It differs from the configuration shown in FIG. 10 in that it uses an amplitude modulation circuit 1601 instead of the pulse width modulation circuit 107 and voltage drive circuit 1008 which carry out pulse width modulation.

The amplitude modulation circuit 1601 contains a D/A converter 16011 for each column directional wire and generates drive pulses with pulse width corresponding to inputted image signal strength. Also, it contains a shift register and retains the drive conditions for the column-directional wires of all the columns by sequentially shifting the drive condition for each column-directional wire, which is received from a control circuit 10010, by means of a sampling clock outputted from the timing signal generator 104. A D/A reference voltage is selected for each D/A converter from among Vra to Vrc according to its drive condition. Among the reference voltages, Vra is the furthest from the selection potential Vs and Vrc is the nearest to the selection potential Vs. Therefore, if the same image signal is input, the amplitude of the drive pulse for the devices in region a is the largest and the amplitude of the drive pulse for the devices in region c is the smallest. (The drive-pulse amplitude here is the difference between a reference potential and the potential according to the image signal strength. The reference potential here is the off-state potential. It is a value between the selection potential and the potential according to the image signal strength and is set so that it can be driven in a matrix. In this example, it coincides with the ground potential.)

Example 8

Figure 17:
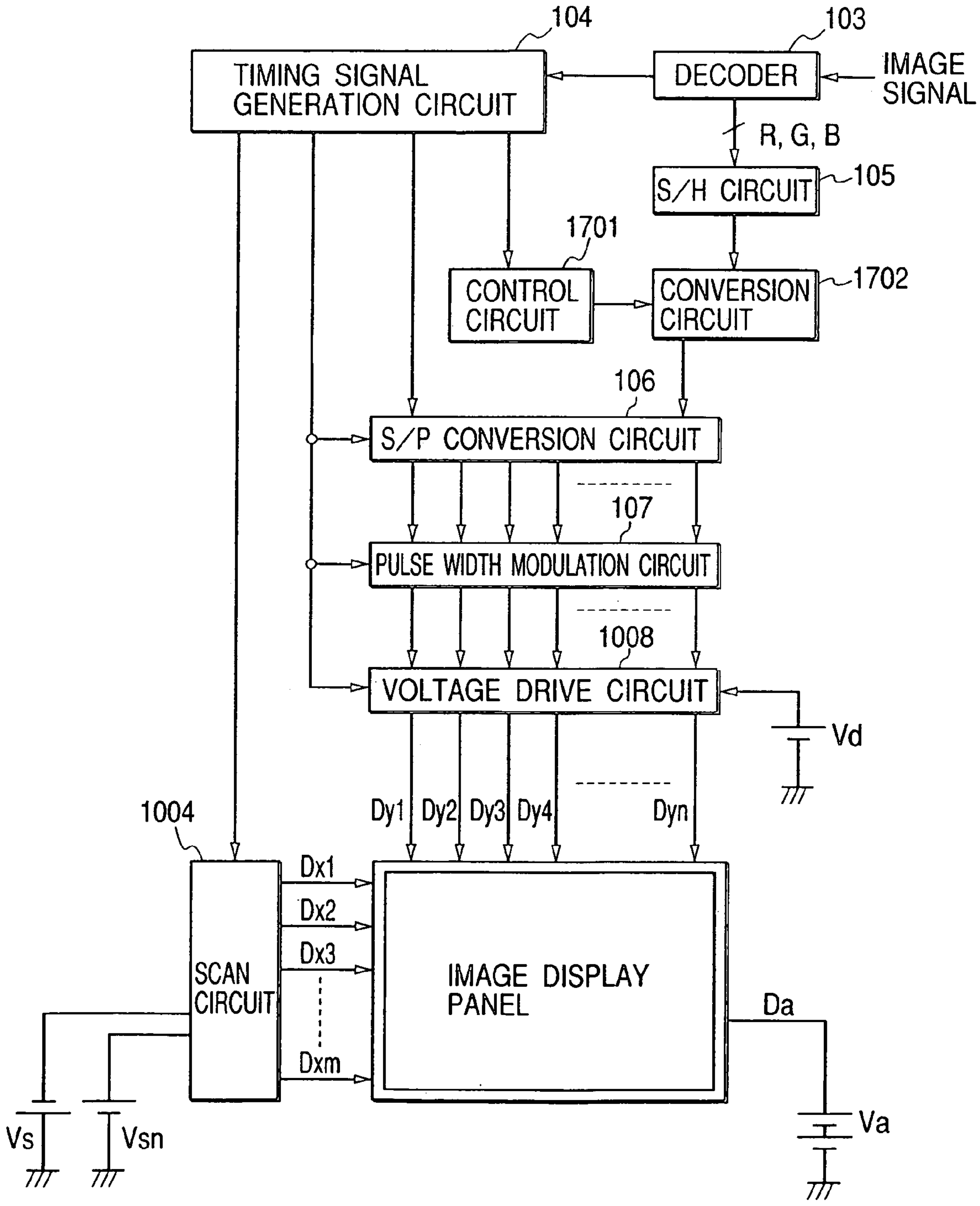
FIG. 17 is a block diagram of an image display apparatus, including a drive circuit, according to a eighth example of the present invention.

The configuration of this example is shown in FIG. 17. It differs from the configurations shown in FIGS. 6 and 10 in that it performs inverse gamma conversion as well as the light quantity correction according to the present invention.

Reference numeral 1701 denotes a control circuit, which receives various timing signals generated by the timing signal generator 104, generates a signal indicating the region which corresponds to the devices to be driven, and gives it to a data conversion circuit 1702. The configurations shown in FIGS. 12A to 12D are applied to the control circuit 1701.

Figure 18:
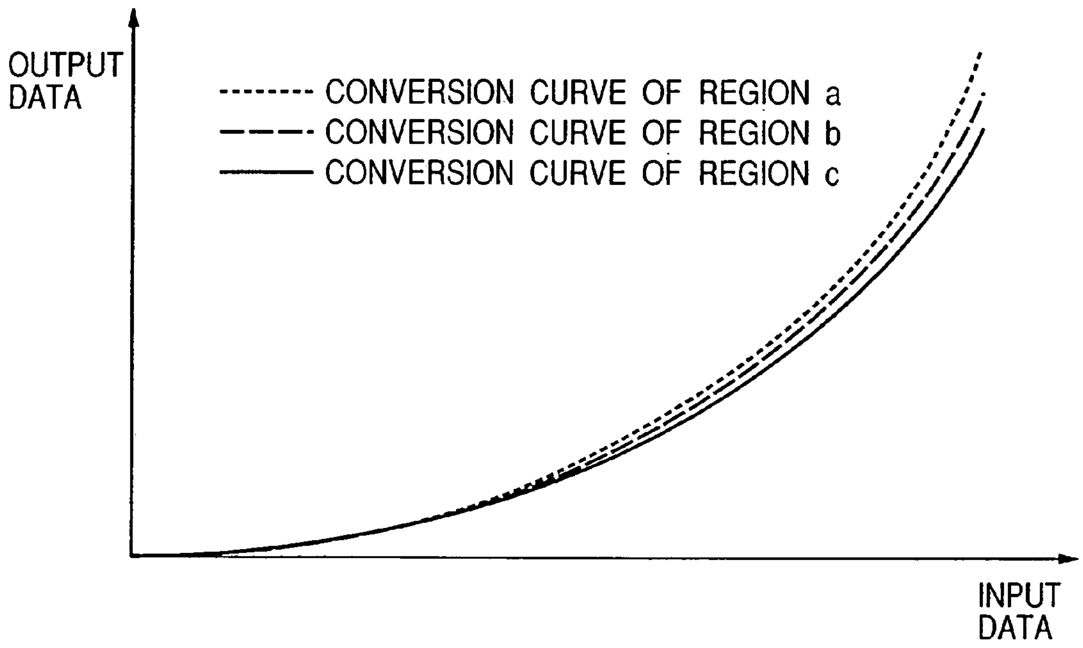
FIG. 18 is a diagram showing transfer characteristics of a conversion circuit used by the eighth example of the present invention.

When using an electron-emitting device whose luminance characteristic with respect to drive pulse width is linear as is the case with the electron-emitting device used in this example, it is necessary to carry out inverse gamma conversion on image data by means of the data conversion circuit 1702. A typical conversion curve is characterized in that output data is proportional to the inverse of the input data raised to the 2.2 power, as represented by a solid line in FIG. 18.

In this example, light quantity correction based on intervals between luminescent spots is performed at the image data stage. According to the signal which is output by the control circuit 1701 and which represents a region, the data conversion circuit 1702 converts data by selecting a conversion curve appropriate for the region containing the devices to be driven. It converts data by using the curve represented by the dotted line in FIG. 18 for the devices in region a, the curve represented by the broken line for the devices in region b, and the curve represented by the solid line for the devices in region c.

As a result, since larger drive pulse widths are provided in regions a and b for the same image data, it is possible to correct visual reduction in luminance and provide a good image without unevenness in luminance.

Incidentally, although examples in which electron-emitting devices are used as display elements have been described above, unevenness will also occur in intervals between luminescent spots or in displacement of luminescent spots from their reference positions due to uneven intervals between display elements when other display elements such as electroluminescent elements are used. The present invention can also be applied to such cases.

As described above, the present invention can improve image quality using a simple configuration.

What is claimed is:

1. Image display apparatus driven in a line sequential scan comprising:

an electron source having a plurality of electron-emitting devices aligned in a matrix and being driven by column-directional wires and row-directional wires, wherein the plurality of electron-emitting devices include first, second and third electron-emitting devices arranged at equal intervals in a column direction such that the first electron-emitting device is disposed between the second and third electron-emitting devices;

a phosphor which is disposed in opposing relation to the electron source and forms a plurality of luminescent spots at different locations on itself by irradiation with electrons emitted from each of the plurality of the electron-emitting devices, wherein the plurality of luminescent spots include at least first, second and third luminescent spots, the first luminescent spot is formed on the phosphor by irradiation with an electron emitted from the first electron-emitting device, the second luminescent spot is formed on the phosphor by irradiation with an electron emitted from the second electron-emitting device, and the third luminescent spot is formed on the phosphor by irradiation with an electron emitted from the third electron-emitting device;

a spacer installed on some of the row-direction wires for sustaining a spatial distance between the electron source and the phosphor;

wherein the first and second luminescent spots are adjacent to each other in the column-direction, with interposing the spacer between the first and second luminescent spots, and the third luminescent spot is adjacent to the first luminescent spot in the column-direction farther from the spacer than the first luminescent spot, without interposing the spacer between the first and third luminescent spots, and electrons respectively emitted from the first and second electron-emitting devices corresponding respectively to the first and second luminescent spots are deflected by the spacer toward the spacer so that an interval in the column-direction between first and second luminescent spots is narrower than that between the first and third luminescent spots, a LUT which stores correction values for respective rows and in response to a signal indicating a row to be driven outputs the correction value for the row to be driven; and a drive circuit for driving each of the plurality of electron-emitting devices of the row to be driven with an image signal multiplied by the correction value for the row to be driven, which is output from the LUT;

wherein the light quantity of at least one of the first and second luminescent spots is smaller than that of the third luminescent spot, for the image signal which requests the same light quantity from the first, second and third luminescent spots.

2. The image display apparatus according to claim 1, comprising a conversion circuit for making said correction, which outputs a converted signal obtained by converting the image signal according to an inverse_gamma_conversion characteristic, and the drive circuit drives each of the plurality of electron-emitting devices according to the converted signal, wherein the conversion circuit has a memory which stores a plurality of inverse_gamma_conversion characteristics differing from each other, and the inverse_gamma_conversion characteristic is selected among the plurality of inverse_gamma_conversion characteristics based on each of the plurality of the values.

3. The image display apparatus according to claim 1, wherein the spacer has a surface coated with an electro-conductive film.

4. Image display apparatus driven in a line sequential scan comprising:

an electron source having a plurality of electron-emitting devices aligned in a matrix and being driven by column-directional wires and row directional wires, wherein the plurality of electron-emitting devices include first, second and third electron-emitting devices arranged at equal intervals in a column direction such that the first electron-emitting device is disposed between the second and third electron-emitting devices;

a phosphor which is disposed in opposing relation to the electron source and forms a plurality of luminescent spots at different locations on itself by irradiation with electrons emitted from each of the plurality of the electron-emitting devices;

a spacer installed on some of the row-directional wires for sustaining a spatial distance between the electron source and the phosphor;

wherein the first and second luminescent spots are adjacent to each other in the column-direction, with interposing the spacer between the first and second luminescent spots, and the third luminescent spot is adjacent to the first luminescent spot in the given column-direction farther from the spacer than the first luminescent spot, without interposing the spacer between the first and third luminescent spots, and electrons respectively emitted from the first and second electron-emitting devices corresponding respectively to the first and second luminescent spots are deflected by the spacer away from the spacer so that an interval in the column-direction between first and second luminescent spots is wider than that between the first and third luminescent spots, a LUT which stores correction values for respective rows and in response to a signal indicating the row to be driven outputs the correction value for the row to be driven; and a drive circuit for driving each of the plurality of electron-emitting devices of the row to be driven with an image signal multiplied by the correction value for the row to be driven, which is output from the LUT;

wherein the light quantity of at least one of the first and second luminescent spots is larger than that of the third luminescent spot, for the image signal which requests the same light quantity from the first, second and third luminescent spots.

5. The image display apparatus according to claim 4, comprising a conversion circuit for making said correction, which outputs a converted signal obtained by converting the image signal according to an inverse_gamma_conversion characteristic, and the drive circuit drives each of the plurality of electron-emitting devices according to the converted signal, wherein the conversion circuit has a memory which stores a plurality of inverse_gamma_conversion characteristics differing from each other, and the inverse_gamma_conversion characteristic is selected among the plurality of inverse_gamma_conversion characteristics based on each of the plurality of the values.

6. The image display apparatus according to claim 4, wherein the spacer has a surface coated with an electro-conductive film.

* * * * *